United States Patent [19]

Otsuka et al.

[11] Patent Number: 6,054,192
[45] Date of Patent: Apr. 25, 2000

[54] METHOD FOR PRODUCING A LAMINATED OBJECT AND APPARATUS FOR PRODUCING THE SAME

[75] Inventors: Yukio Otsuka, Aichi-ken; Motoaki Ozaki, Okazaki; Hiromoto Sato, Nagoya, all of Japan

[73] Assignee: Toyota Jidosha Kabushiki Kaisha, Japan

[21] Appl. No.: 09/010,855

[22] Filed: Jan. 22, 1998

[30] Foreign Application Priority Data

| Jan. 29, 1997 | [JP] | Japan | 9-015702 |
| Jan. 31, 1997 | [JP] | Japan | 9-018885 |
| Feb. 6, 1997 | [JP] | Japan | 9-023730 |

[51] Int. Cl.$^7$ ................ B32B 31/00; D04H 1/16
[52] U.S. Cl. ............ 427/555; 156/272.8; 264/497; 264/113; 427/559
[58] Field of Search ................ 427/512, 554, 427/555, 556, 596, 559; 156/272.8, 58; 264/401, 497, 112, 113; 419/8, 9

[56] References Cited

U.S. PATENT DOCUMENTS

| 4,247,508 | 1/1981 | Housholder . | |
| 4,575,330 | 3/1986 | Hull . | |
| 4,600,309 | 7/1986 | Fay . | |
| 4,915,897 | 4/1990 | Farrington et al. | 264/113 |
| 4,927,685 | 5/1990 | Marshall et al. | 264/113 |
| 4,938,816 | 7/1990 | Beaman et al. | 264/497 |
| 5,056,998 | 10/1991 | Goossens | 264/113 |
| 5,290,992 | 3/1994 | Lin et al. . | |
| 5,352,405 | 10/1994 | Beaman et al. | 264/497 |
| 5,354,414 | 10/1994 | Feygin | 264/497 |
| 5,364,744 | 11/1994 | Buican et al. . | |
| 5,393,482 | 2/1995 | Benda et al. | 264/497 |
| 5,437,820 | 8/1995 | Brotz | 264/497 |
| 5,504,301 | 4/1996 | Eveland . | |
| 5,519,724 | 5/1996 | Tatah . | |
| 5,695,708 | 12/1997 | Karp et al. | 264/497 |
| 5,718,279 | 2/1998 | Satoh et al. | 164/456 |
| 5,718,729 | 2/1998 | Satoh et al. . | |
| 5,730,925 | 3/1998 | Mattes et al. | 264/497 |

FOREIGN PATENT DOCUMENTS

| 0 416 852 | 3/1991 | European Pat. Off. . |
| 0 416 852 A2 | 3/1991 | European Pat. Off. . |
| 0450 762 A1 | 10/1992 | European Pat. Off. . |
| 0525 872 A1 | 2/1993 | European Pat. Off. . |
| 0577260A2 | 1/1994 | European Pat. Off. . |
| 0 776 713 | 6/1997 | European Pat. Off. . |
| 0776 713 A2 | 6/1997 | European Pat. Off. . |
| 4415783A1 | 8/1995 | Germany . |
| 3-55224 | 3/1991 | Japan . |
| 3-183530 | 8/1991 | Japan . |
| 8-502703 | 3/1996 | Japan . |
| WO 91/12120 | 8/1991 | WIPO . |

OTHER PUBLICATIONS

Abstracts of Japan 07 001593, Jan. 6, 1995.
Abstracts of Japan 03 208678, Sep. 11, 1991.
English Abstract of JP 07 001593 A, Goto *Patent Abstracts of Japan*, vol. 95, No. 4, May 31, 1995.
English Abstract of JP 07 266429 A, Sasuhittiroharu *Patent Abstracts of Japan*, vol. 96, No. 2, Feb. 29, 1996.
English Abstract of JP 63 177004 A, Kono Hidekazu *Patent Abstracts of Japan*, vol. 12, No. 453, Jul. 12, 1988.

(List continued on next page.)

*Primary Examiner*—Marianne Padgett
*Attorney, Agent, or Firm*—Finnegan, Henderson, Farabow, Garrett & Dunner, L.L.P.

[57] ABSTRACT

A method for producing a laminated object repeats a depositing step and an irradiating step alternatively. The irriating step comprises the operations of: covering a deposited layer with a mask having a pattern configuration for penetrating the laser beam; and scanning the lader beam on the desposited layer covered with the mask in such a manner that the laser beam depicts an irradiated continous wave trace being wider than the pattern configuration of the mask, by moving the laser beam in the Y-direction with a Y-rotating mirror, while repeating oscillations of the laser beam in the X-direction with a X-rotating nirror, The laminated object may be a casting mold.

7 Claims, 20 Drawing Sheets

OTHER PUBLICATIONS

English Abstract of JP 63 243804 A, Shimozono Hiroaki *Patent Abstracts of Japan,* vol. 13, No. 50, Feb. 6, 1989.

English Abstract of JP 03 208678A, Mori Akiro *Patent Abstracts of Japan,* vol. 15, No. 485, Dec. 9, 1991.

English Abstract of JP 02163925, Kamata Toru publication date Jun. 25, 1990.

English Abstract of JP 01232027, Murata Katsuhide publication date Sep. 18, 1989.

Copy of European Search Report.

Time

METHOD FOR PRODUCING A LAMINATED OBJECT AND APPARATUS FOR PRODUCING THE SAME

BACKGROUND OF THE INVENTION

1. Field of the Invention

This invention relates to a method and an apparatus for producing a laminated object in which a deposited layer, constituted by depositing a material capable of forming a solid layer, is irradiated with a laser beam to form a solid layer and in which the solid layers are piled to constitute a three-dimensional laminated object.

2. Description of the Related Art

A method for producing a laminated object has been developed recently. This method is disclosed in Japanese Unexamined Patent Publication (KOKAI) No.3-183,530, U.S. Pat. No. 4,247,508, and others. This method alternatively repeats a depositing step and an irradiating step. In the depositing step, grains are deposited to constitute a deposited layer. In the irradiating step, the deposited layer is irradiated with a laser beam to constitute a solid layer and a large number of solid layers are piled to produce a three-dimensional laminated object. This method, as appreciated in FIG. 26, has a problem that convex portions 301, having a diameter corresponding a spot diameter "D" of the laser beam substantially, remain at an edge of a solid layer 300. An increase of the spot diameter "D" generates that the convex portions 301 are large to deteriorate accuracy at an edge of the solid layer 300, thereby deteriorating accuracy at an edge of the three-dimensional laminated object. For realizing excellent accuracy at the edge of the three-dimensional laminated object, it is required that the spot diameter "D" is extremely small. For instance, the spot diameter "D" is as minute as 0.2 mm. This case improves accuracy at the edge of the three-dimensional laminated object; however, this case increases a required irradiation time considerably and causes a disadvantage in high speed production and production ability. This method, therefore, is not always fitted to mass production but is fitted to production of experimental articles.

For improving production ability in this method, it is a preferable mode to increase laser output. This mode, however, excessively increases irradiation energy with respect to the deposited layer per unit area. Thus, this mode requires that scanning speed and on- off control speed of the laser beam are high for preventing overheat. Also, high speed in scanning speed exhibits a limit at a present situation; so, improving production ability is very hard in this method.

For improving production ability, it is another preferable mode to use a spurious laser beam generated by means of a segment mirror method, a kalaid scope method, and the like. This mode, however, trends to cause energy eneveness of the laser beam; so, this mode is not always fitted in producing a three-dimensional laminated object.

Also, the above-mentioned laminated object producing method is disclosed in National Unexamined Patent Publication of the Translated Version of PCT Application (KOHYO) No. 8-502,703. This method, as appreciated in FIG. 27, uses a raking member 400 coming into contact with the deposited layer 300. A top end of the raking member 400 rakes a surface of the deposited layer 300 in the depositing step to average a thickness of the deposited layer 300.

Another method is disclosed in Japanese Unexamined Patent Publication (KOKAI) No. 3-183,530. This method, as appreciated in FIG. 28, uses a rotating roller 500 coming into contact with the deposited layer 300. The rotating roller 500 levels a surface of the deposited layer 300 in a depositing step to average a thickness of the deposited layer 300. In accordance with such publication method, the raking member 400 and the rotating roller 500 always comes into contact with the deposited layer 300.

In accordance with such publication methods, since the deposited portions is raked to be levelled by using the raking member 400 or by using the rotating roller 500, a frictional force is easily applied to a lower layer formed under the deposited layer 300, thereby slipping or damaging the lower layer by a shear stress. This deteriorates accuracy of the laminated object. As result, in such publication methods, it is required that a depositing speed of a depositing apparatus is set at a low speed or an ultra low speed during depositing step. Also, since a limit exists in increasing the depositing speed and the forming speed, such publication methods may cause insufficient production ability, in particular, because of a large number of the layers. So, the method for the three-dimensional laminated object isn't fittable to mass production although it is fittable to experimental articles.

SUMMARY OF THE INVENTION

The present invention has been developed in view of the aforementioned circumstances. It is therefore a first aim of the present invention to provide a laminated object producing method and an apparatus which improve accuracy at an edge of a solid layer so as to improve accuracy of a three-dimensional laminated object, thereby expanding and fitting a spot diameter of a laser beam and thereby enlarging a freedom in selecting the spot diameter of the laser beam.

It is a second aim of the present invention to provide a laminated object producing method and an apparatus which uniformly irradiate a large area in comparison with a system using a spurious laser beam and which advantageously produce a sufficient solid layer and a sufficient three-dimensional laminated object.

It is a third aim of the present invention to provide a laminated object producing method and an apparatus which advantageously prevent overheat in a deposited layer, a peeling of a solid layer, and insufficient hardness of a solid layer.

It is a fourth aim of the present invention to provide a laminated object producing method and an apparatus which advantageously increase a depositing speed to improve production ability.

It is a fifth aim of the present invention to provide a laminated object producing method and an apparatus which contribute to mass production of a three-dimensional laminated object as well as an experimental article.

In a first aspect of the present invention, a method for producing a three-dimensional laminated object repeats a depositing step and an irradiating step alternatively so as to pile solid layers in a thickness direction. In the depositing step, a material, capable of forming the solid layer by receiving a laser beam, is deposited by using a depositing means to constitute a deposited layer. In the irradiating step, the deposited layer is irradiated with a laser beam to constitute the solid layer having a two-dimensional horizontal surface providing a X-direction and a Y-direction.

The irradiating step in a first aspect comprises the operations of:

covering the depositing layer with a mask having a pattern configuration for penetrating the laser beam; and scanning the laser beam on the deposited layer covered with the mask in such a manner that the laser beam depicts an irradiated continuous wave trace being wider than the pattern configuration of the mask, by moving the laser beam in the Y-direction with a Y-rotating mirror for moving the laser beam in the Y-direction, while repeating oscillations of the laser beam in the X-direction with a X-rotating mirror for oscillating the laser beam in the X-direction.

In a preferable mode of the first aspect of the present invention, the irradiated continuous wave trace, in its top plan view, is a zigzag trace constituted by continuing a triangular wave or an approximate triangular wave. This mode is advantageous in realizing a uniform distribution of irradiation energy, thereby allowing the solid layer to be uniform so as to produce a three-dimensional laminated object sufficiently.

In a preferable mode of the first aspect, the material is constituted from grains or powders covered with thermosetting resin. In a preferable mode of the first aspect, the three-dimensional laminated object is a mold for casting.

In a second aspect of the present invention, the method for producing a laminated object repeats a depositing step and an irradiating step alternatively so as to pile solid layers in a thickness direction. In the depositing step, a material, capable of forming the solid layer by receiving a laser beam, is deposited by using a depositing means to constitute a deposited layer. In the irradiating step, the deposited layer is irradiated with the laser beam to constitute the solid layer having a two-dimensional horizontal surface providing a X-direction and a Y-direction.

The method in the second aspect comprises the step of:

detecting at least one of the deposited layer and the material before depositing in temperature by using a temperature detecting means, thereby increasing or decreasing energy of the laser beam depending on the detected temperature results so as to prevent the solid layer from being heated excessively.

In a third aspect of the present invention, an apparatus for producing a laminated object comprises:

a depositing means for depositing a material in a state having a two-dimensional horizontal surface providing a X-direction and a Y-direction so as to constitute a deposited layer, the material capable of forming a solid layer by receiving a laser beam;

a mask arranging apparatus for arranging a mask having a pattern configuration for penetrating the laser beam so as to cover the deposited layer with the mask; and an irradiating apparatus for moving the laser beam at least one time in the Y-direction while oscillating the laser beam in a large number of times in the X-direction, thereby scanning the laser beam on the deposited layer covered with the mask in such a manner that the laser beam depicts an irradiated continuous wave trace being wider than the pattern configuration of the mask.

In a fourth aspect of the present invention, a method for producing a laminated object, repeats a depositing step and an irradiating step alternatively so as to pile solid layers in a thickness direction. In the depositing step, a material, capable of forming the solid layer by receiving a laser beam, is deposited by using a depositing means to constitute a deposited layer. In the irradiating step, the deposited layer is irradiated with the laser beam to constitute the solid layer having a two-dimensional horizontal surface providing a X-direction and a Y-direction.

The depositing step in the fourth aspect comprising the operation of:

keeping the depositing means and the depositing layer being apart from each other in such a manner that the depositing means comes into non-contact with the deposited layer during depositing the material.

In a preferable mode of the fourth aspect, the deposited layer has an over thickness portion in addition to a normal thickness portion. The depositing step of this mode further comprises the operation of:

using a thickness correcting means for coming into non-contact with the normal thickness portion and for coming into contact with the over thickness portion;

keeping the depositing means in such a manner that the thickness correcting means comes into non-contact with the normal thickness portion of the deposited layer and that the thickness correcting means comes into contact with the over thickness portion so as to correct the over thickness portion during depositing the material.

In a preferable mode of the fourth aspect, the depositing means comprises a storing container for storing the material, and a cutting roller rotatably disposed at the storing container and adapted to discharge the material from the storing container owing to its rotation. The depositing step of this mode further comprises the operation of:

transferring the depositing means apart from the deposited layer while rotating the cutting roller so as to discharge and deposit the material, and thereby keeping the depositing means in such a manner that the depositing means comes into non-contact with the deposited layer during depositing the material. This mode may discharge the grain-like material little by little by using the cutting roller, which allows the grain-like material to be deposited uniformly thereby suppressing fluctuations in thickness of the deposited layer so as to improve shape accuracy of three-dimensional laminated object.

A rotational speed of the cutting roller may be much larger than a transferring speed of the depositing means. In a preferable mode, the depositing means is capable of being transferred forward and backward, and a rotational direction of the cutting roller is changeable depending on a transferring direction of the depositing means. The depositing step of this mode comprises the operation of: selecting either a mode in which the rotational direction of the cutting roller corresponds to the transferring direction of the depositing means, or another mode in which the rotational direction of the cutting roller is reverse to the transferring direction of the depositing means.

A preferable mode of the fourth aspect may use the following apparatus for producing a laminated object. This apparatus comprises: an irradiating means for emitting a laser beam; a depositing means for depositing a material to constitute a deposited layer, the material is capable of forming a solid layer by receiving the laser beam; and a non-contact transferring means for transferring the depositing means apart from the deposited layer in such a manner that the depositing means comes into non-contact with the deposited layer.

In a fifth aspect of the present invention, a method for producing a laminated object repeats a depositing step and an irradiating step alternatively so as to pile solid layers in a thickness direction. In the depositing step, a material, capable of forming the solid layer by receiving a laser beam, is deposited by using a depositing means to constitute a deposited layer. In the irradiating step, the deposited layer is irradiated with the laser beam to constitute the solid layer having a two-dimensional horizontal surface providing a X-direction and a Y-direction.

The depositing step of fifth aspect comprises the operations of: detecting a thickness of the deposited layer by using a thickness detecting means for detecting a physical amount about thickness of the deposited layer indirectly or directly; and correcting a thickness of the next deposited layer depending on the results detected with the thickness detecting means so as to keep a target thickness of the laminated object.

In a preferable aspect of the fifth aspect, the thickness detecting means detects a physical amount about the thickness of the deposited layer in such a manner the thickness detecting means comes into non-contact with the deposited layer.

In a sixth aspect of the present invention, the method for producing a laminated object repeats a depositing step and an irradiating step alternatively so as to pile solid layers in a thickness direction. In the depositing step, a material, capable of forming the solid layer by receiving a laser beam, is deposited by using a depositing means to constitute a deposited layer. In the irradiating step, the deposited layer is irradiated with the laser beam to constitute the solid layer having a two-dimensional horizontal surface providing a X-direction and a Y-direction, The method of the sixth aspect uses plural arranging apparatuses provided for arranging the deposited layer, and uses a common irradiating apparatus capable of emitting the laser beam to each of the plural arranging apparatuses. The irradiating step of the sixth aspect comprises the operation of sharing the common irradiating apparatus among the plural arranging apparatuses.

In a preferable aspect of the sixth aspect, the common irradiating apparatus comprises a laser beam supplying means for emitting the laser beam, and a plurality of distributors for distributing the laser beam emitted from the laser beam supplying means among the plural arranging apparatuses. The irradiating step of this mode comprises the operation of: distributing the laser beam sequentially to the deposited layer on each of the plural arranging apparatuses by working each of the distributors individually and sequentially.

A preferable mode of the sixth aspect may use the following apparatus. This apparatus comprises: plural arranging apparatuses provided for arranging the deposited layer individually; and a common irradiating apparatus capable of distributing the laser beam among the plural arranging apparatuses.

In a eighth aspect of the present invention, a method for producing a laminated object repeats a depositing step and an irradiating step alternatively so as to pile solid layers in a thickness direction. In the depositing step, a material, capable of forming the solid layer by receiving a laser beam, is deposited by using a depositing means to constitute a deposited layer. In the irradiating step, the deposited layer is irradiated with the laser beam to constitute the solid layer having a two-dimensional horizontal surface providing a X-direction and a Y-direction. The method of the eighth aspect uses a maskholder capable of holding plural of masks side by side, the mask having a pattern configuration for penetrating the laser beam, and a maskholder driving means for driving the maskholder in such a manner that one mask of the plural masks is capable of facing the deposited layer on the depositing means. The method of this aspect comprises the operations of: keeping one mask of the plural masks facing to the deposited layer on the depositing means in such a manner that the one mask covers the deposited layer and that the other masks of the plural masks don't face the deposited layer; and irradiating the deposited layer covered with the one mask by the laser beam, while exchanging at least one of the other masks which don't face the deposited layer.

In a ninth aspect of the present invention, a material capable of forming a solid layer by receiving a laser beam is deposited to constitute a deposited layer, the deposited layer is irradiated with the laser beam to constitute the solid layer having a two-dimensional horizontal surface, and the solid layers are piled so as to constitute the three-dimensional laminated object.

The apparatus of this aspect comprises: an arranging apparatus provided for arranging the deposited layer; an irradiating apparatus capable of emitting the laser beam to the arranging apparatus; a maskholder capable of holding plural of masks side by side; a maskholder driving means for driving the maskholder in such a manner that one mask of the plural masks faces the deposited layer on the arranging apparatus and that the other masks don't face the deposited layer on the depositing means; and a mask exchanging apparatus for exchanging at least one of the other masks which don't face the deposited layer. In the ninth aspect, at least one of the other masks which don't face the deposited layer is exchanged during a period that the deposited layer covered with the one mask is irradiated by the laser beam.

In a preferable mode of the ninth aspect, the laminated object is constituted by piling odd-numbered solid layers and even-numbered solid layers; the maskholder is capable holding an even-numbered-mask for forming the even-numbered solid layer, and an odd-numbered-mask for forming the odd-numbered solid layer; and the mask exchanging apparatus includes an odd-numbered-mask exchanging apparatus and an even-numbered-mask exchanging apparatus.

ADVANTAGES OF THE INVENTION

According to the first aspect of the present invention, the deposited layer is irradiated with the laser beam, with the deposited layer being covered with the mask; thus, shape accuracy at the edge of the solid layer is improved to secure shape accuracy at the edge of the three-dimensional laminated object even when a spot diameter of the laser beam is increased. The first aspect of the present invention may increase and fit the spot diameter of the laser beam while improving the accuracy, thereby preventing overconcentration of the laser beam so as to suppress overhardness of the deposited layer, in particular, the most outside surface of the deposited layer. As a result, it is advantageous to obtain the sufficient solid layer and the sufficient the laminated object. Further, the first aspect is advantageous in shortening a scann irradiation time to contribute to improvement in production ability, because of increase of the spot diameter of the laser beam.

The first aspect of the present invention uses a scann system in which scann irradiation is carried out by using the X-rotating mirror, thereby improving uniformity of irradiation energy in an irradiation area, which allows the solid layer to be uniformity to form the sufficient laminated object, in comparison with a non-scann system in which a spurious laser beam, generated by means of a kalaid scope method, is emitted.

According to the second aspect of the present invention, before and during the depositing step, at least one of the deposited layer and the material is detected in temperature by using the temperature detecting means, and laser beam energy is increased or decreased depending on the detected temperature results. Thus, the second aspect decreases irradiation energy in the case where temperature in the deposited layer or the material excessively rises with the forming; this aspect increases irradiation energy in the case where the temperature in the deposited layer or the material is excessively reduced with the forming. As a result, the second aspect is advantageous in obtaining the sufficient solid layer and the sufficient laminated object.

According to the fourth aspect of the present invention, in the depositing step, the depositing means and said deposited layer are kept apart from each other, which prevents friction between the depositing means and the depositing layer. This prevents the lower layer under tha deposited layer from being slipped and damaged. Thus, the second aspect prevents shape accuracy of the laminated object from being deteriorated so as to improve shape accuracy of the laminated object. Since the second aspect prevents the friction between the depositing means and the deposited layer, it is advantageous in increasing a transferring speed of the depositing means, a depositing speed, and a forming speed so as to improve production ability.

In a preferable mode of the fourth aspect, when a deposited layer has an over thickness portion being thicker than a normal thickness portion, the thickness correcting means comes into contact with the over thickness portion. Thus, the over thickness portion is corrected to substantially become a normal thickness, and thereby this mode is advantageous in improving shape accuracy of the laminated object and in improving a transferring speed of the depositing means to improve production ability.

The fourth aspect keeps the depositing means and the deposited layer coming into non-contact with each other, and thereby it is advantageous in increasing a transferring speed of the depositing means, a depositing speed so as to improve production ability.

In a preferable mode of the fourth aspect, a rotational speed of the cutting roller is much larger than a transferring speed of the depositing means. Thus, this mode is advantageous in improving uniformity of depositing the material so as to improve shape accuracy of the laminated object in comparison with the case where a rotational speed of the cutting roller is excessively smaller than a transferring speed of the depositing means An another preferable mode of the fourth aspect may change a rotational direction of the cutting roller depending on a transferring direction of the depositing means. Thus, this mode can effectively use both of the depositing means transferring forward and backward to increase a depositing speed and a forming speed so as to improve production ability.

In the fifth aspect of the present invention, the thickness detecting means uses for detecting a physical amount about the thickness of the deposited layer, a correcting treatment is carried out for correcting the thickness of the deposited layer depending on the detected results. Thus, this aspect corrects fluctuations in thickness of the deposited layer to improve shape accuracy of the laminated object even if the thickness of the deposited layer varies because of various causes, thereby improving shape accuracy of the laminated object in a thickness direction, a laminated direction.

In the preferable mode of the fifth aspect, the thickness detecting means detects the physical amount about the thickness of the deposited layer in non-contact with the deposited layer. This mode prevents the deposited layer or the lower layer from being slipped or damaged during detecting thickness, which suppresses fluctuations in thickness of the deposited layer to improve shape accuracy of the laminated object.

The sixth aspect of the present invention shares the common irradiating apparatus, emitting the laser beam to the deposited layer, among the plural arranging apparatuses. Thus, this aspect advantageously improves production ability for forming the laminated object while simplifying the number of common irradiating apparatuses. Since the common irradiating apparatus is generally expensive, this aspect is advantageous in decreasing equipment costs and in improving production ability.

In the preferable mode of the sixth aspect, the distributors distributes the laser beam, emitted from the laser beam supplying means, among the plural arranging apparatuses. Thus, this mode advantageously improves production ability for forming the laminated object while simplifying the number of laser beam supplying means.

In the eighth and the ninth aspects of the present invention, the deposited layer, covered with the mask, is irradiated by the laser beam, and the mask exchanging apparatus exchanges the mask which doesn't face the deposited layer. Namely, the mask which doesn't face the deposited layer is exchanged during a period that the deposited layer covered with one mask is irradiated with the laser beam. That is to say, these aspects may simultaneously carried out the irradiating step and the mask changing step to improve production ability.

In the preferable mode of the ninth aspect, the mask exchanging apparatus includes the odd-numbered-mask exchanging apparatus and the even-numbered-mask exchanging apparatus. Thus, this mode exchanges the odd-numbered-mask and the even-numbered-mask respectively and independently. That is to say, this mode carries out the mask exchanging step for exchanging the even-numbered-mask, while carrying out the irradiating step by using the odd-numbered-mask. Thus, this mode is advantageous in improving production ability.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
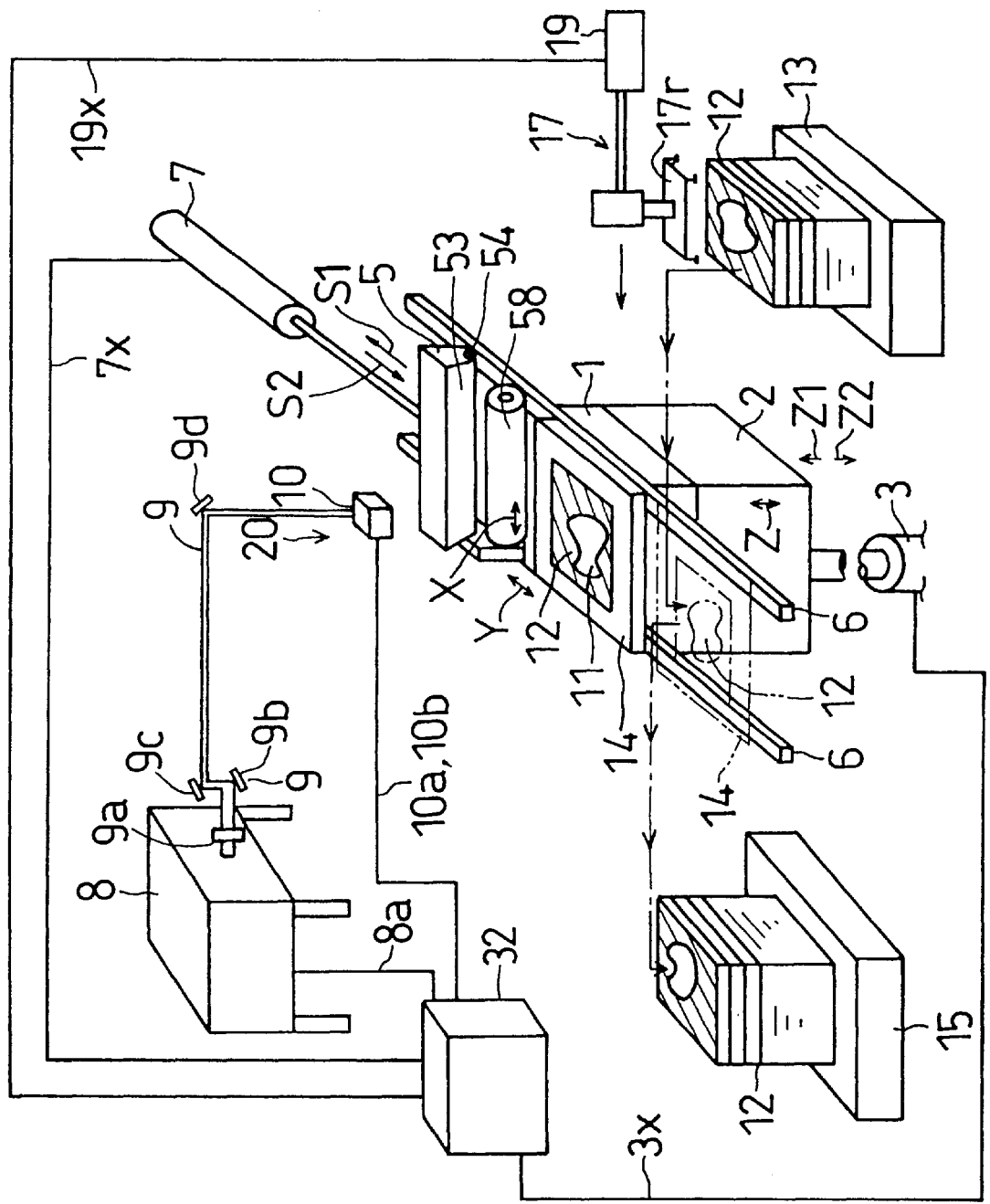
FIG. 1 is a perspective view schematically illustrating a whole construction in Example 1.

Having generally described the present invention, a further understanding can be obtained by reference to the specific preferred embodiments which are provided herein for purposes of illustration only and not intended to limit the scope of the appended claims.

The preferred embodiments will be hereinafter described with reference to the accompanied drawings.

First Preferred Embodiment

A mask according to the present invention has a function for a laser beam to penetrate thereinto and a function for interrupting penetration of the laser beam. The mask therefore has a beam penetrating portion and a beam interrupting portion. The beam penetrating potion may be an opening in many cases. In the case of a YAG laser beam, it penetrates through transparent quartz glass; thus, the mask may be constituted by printing a beam interrupting film on transparent quartz glass having no openings so as to form the beam interrupting portion and the beam penetrating portion.

A depositing material according to the present invention is to be a solid layer when it is irradiated with a laser beam. The material may be grains, powders, and liquids—grains covered with thermosetting resin, grains and powders made from thermosetting resin, and grains and powders made from metal. These materials form a solid layer by receiving a laser beam. The thermosetting resin may be phenolic resin.

A X-rotating mirror or a Y-rotating mirror according to the present invention may be a galvano mirror mode for oscillating a mirror, and a polygon mirror mode for rotating a polyhedron mirror continuously in one direction.

A laser beam according to the present invention may be selected from well-known laser beams, such as a $CO_2$ laser beam, a YAG laser beam, a Ar laser beam, a ruby laser beam, or an excimer laser beam. It may be a visible ray or an invisible ray. A laser output may properly be selected on occasion.

When a spot diameter of the laser beam is excessively small with respect to a laser output, even if irradiation energy is identical per unit area, the most outside surface of the deposited layer is overheated to become overhardness to cause a deep portion insufficient heat, which deteriorates the bonding between the solid layers, thereby generating defects such as a separation and a warp of the solid layer.

On the other hand, when the spot diameter of the laser beam is excessively large with respect to a laser output, a deposited layer is hard to be reached into a required heat temperature. Thus, the solid layer is easy to become insufficient hardness. The spot diameter of the laser beam is set under such considerations.

An upper limit of the spot diameter may corresponds to 20 mm, 50 mm, 80 mm, 100 mm, and more in response to a laser output, size of the laminated object. An lower limit of the spot diameter may corresponds to 0.2 mm, 1 mm, 2 mm, 4 mm, 8 mm, and more. An increase of the laser beam output is advantageous in increasing the spot diameter with an irradiation unevenness suppressed.

In the present embodiment, before and during irradiation, a temperature detecting means detects temperature of at least one of the deposited layer and the material before the depositing step, and thereby energy of the laser beam is increased or decreased depending on the detected temperature results. When a temperature detected by the temperature detecting means is higher than target temperatures, the present embodiment carries out at least one of increasing an irradiation speed and decreasing output of a laser oscillator. When a temperature detected by the temperature detecting means is lower than target temperatures, the present embodiment carries out at least one of decreasing the irradiation speed and increasing output of the laser oscillator.

In detecting temperature, it is preferable to detect a region which is not directly irradiated with the laser beam. The reason is that it is capable to detect original temperature of the deposited layer since the temperature is stable before irradiation. The temperature detecting means may be in a contacting mode or a non-contacting mode with respect to the deposited layer. It may be, for instance, a thermocouple, a thermister, a radiation temperature meter.

Example 1

Example 1 will be hereinafter described with reference to FIGS. 1 to 9.

FIG. 1 illustrates a whole construction in which a X-direction and a Y-direction, crossing at right angles, exhibit the two-dimensional horizontal surface, and a Z-direction exhibits the height direction. As appreciated in FIG. 1, equipment in Example 1 includes: (1) a lift apparatus 2 having a lift table 1 capable of being raised and lowered in the Z-direction; (2) a first driving means 3 for raising and lowering the lift table 1; (3) a depositing apparatus 5 for storing resin coated sand and for depositing the resin coated sand on the lift table 1 to constitute a deposited layer; (4) a second driving means 7 for transferring the depositing apparatus 5 along guiding rails 6 in the Y-direction; (5) a laser oscillator 8 ($CO_2$ laser) for emitting a laser beam; (6) a transmitting system 9 for transmitting the laser beam; (7) a mirror rotating device 10 for oscillating the laser beam; (8) a mask supplying stand 13 for piling a plurality of unused masks 12 thereon; (9) a mask collecting stand 15 for piling a plurality of used masks 12; (10) a mask arranging apparatus 17 for carrying the used mask 12 from a maskholder 14 to the mask collecting means 15 and for carrying the unused mask 12 from the mask supplying stand 13 to maskholder 14.

The maskholder 14 is capable of being transferred along the guiding rails 6 in the Y-direction with the mask 12, it has a function to insert the mask 12 into the lift table 1 and to withdraw the mask 12 from the lift table 1.

The mask arranging apparatus 17 includes an absorbing portion 17r for holding the mask 12 one by one with magnetism or vacuum, and a third driving means 19 for driving the absorbing portion 17r. Each of the first driving means 3, the second driving means 7, and the third driving means 19 may preferably be cylinder machinery, it is sometimes motor machinery such as step-motors determining a driving amount depending on the number of electric pulses. A controller 32 controls the first driving means 3 by way of a signal line 3x, the second driving means 7 by way of a signal line 7x, and the third driving means 19 by way of a signal line 19x. The mask 12 is constituted by using plates having resistance to a laser beam, such as steel plates, and aluminum plates. The mask 12 includes an opening 11 having a designated pattern configuration through which the laser beam penetrates. The opening 11 is enough to penetrate the laser beam.

Figure 2:
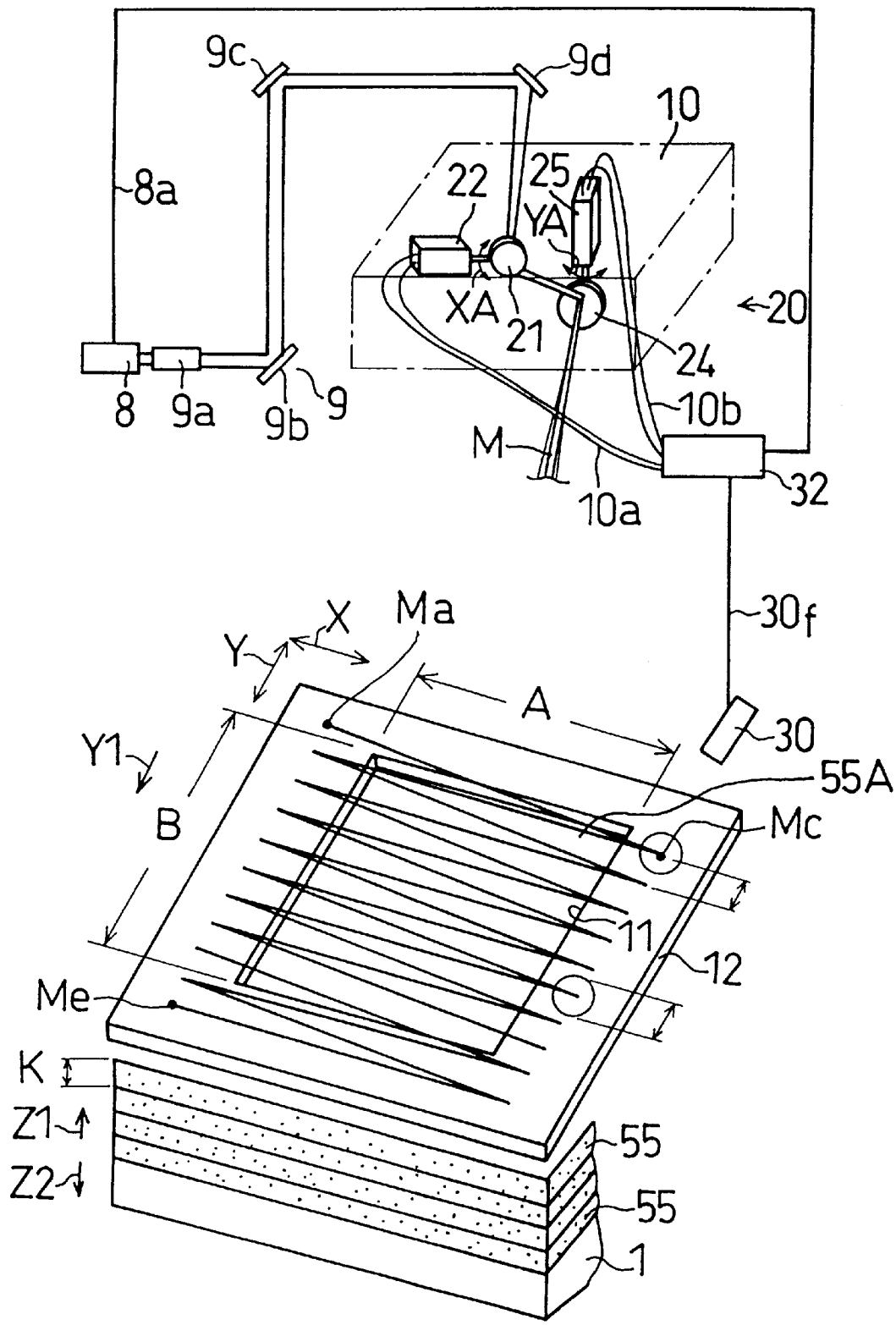
FIG. 2 is a constitutional view schematically illustrating a manner carrying out scann-irradiation with a mirror rotating device in Example 1.

FIG. 2 illustrates a major construction. The laser beam, emitted from the laser oscillator 8 working as a laser beam supplying means, is enlarged and controls with a beam expander 9a to reach the mirror rotating device 10 by way of mirrors 9b,9c,9d. The mirror rotating device 10 has a X-galvanoscanner 22 including a X-rotating mirror 21 for being oscillated in a "XA" direction, and a Y-galvanoscanner 25 including a Y-rotating mirror 24 for being oscillated in a "YA" direction. When the X-rotating mirror 21 is oscillated at a designated frequency in the XA direction, the laser beam is oscillated at an identical frequency in the X-direction. When the Y-rotating mirror 24 is oscillated at a designated frequency in the YA direction, the laser beam oscillating in the X-direction is moved in a Y1 direction out of the Y-directions. The irradiating apparatus 20 therefore is constituted with the laser oscillator 8, the transmitting system 9, and the mirror rotating device 10.

In Example 1, as appreciated in FIG. 2, during the irradiating step, the laser beam is oscillated between an irradiated end "Ma" and an irradiated end "Mc" in the X-direction.

Also, the oscillating laser beam is moved one time from the irradiated end "Ma" to an irradiated end "Me" in the Y1 direction, thereby depicting an irradiated continuous wave trace with the laser beam, as shown in FIG. 2. As appreciated in FIG. 2, an irradiated continuous wave trace is a zigzag trace constituted by continuing apexes of a triangular wave of an approximate triangular wave.

Figure 4:
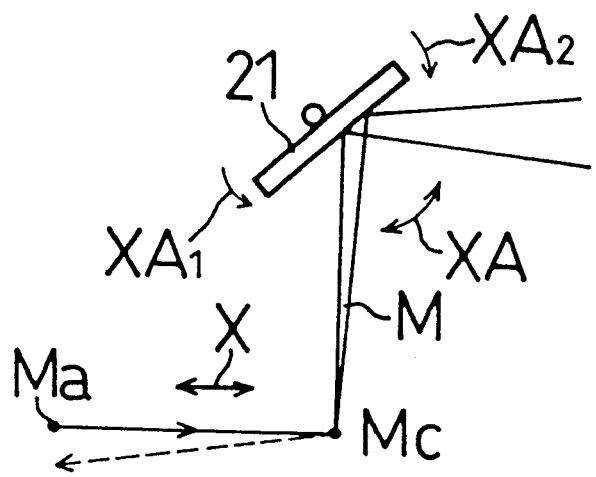
FIG. 4 is a constitutional view schematically illustrating a manner that a X-rotating mirror is oscillated in Example 1.

In order to irradiate such a wave, as appreciated in FIG. 4, it is required that the X-rotating mirror 21 is rotated in a $XA_1$ direction to emit the laser beam "M" from the irradiated end "Ma" to the irradiated end "Mc", and that thereafter the X-rotating mirror 21 is reversed to an opposite direction, a $XA_2$ direction. Thus, in Example 1, a frequency of the laser beam in the X-direction is set not to be excessive large. So, in Example 1, the laser beam easily depicts a good triangular or an approximate good triangular during the irradiating step. FIG. 4 omits the Y-rotating mirror 21.

When such a good triangular wave is obtained, an energy density distribution in the X-direction exhibits a characteristic line "Ea" in FIG. 5(C) showing a manner that a width of a flat region "Ec" is long although the irradiated ends "Ma" and "Mc" exhibit a greater energy density. Therefore, it is advantageous to level the energy density distribution in the deposited layer in the X-direction so as to a sufficient solid layer 55A. FIGS. 5(A) and 5(C) show that a horizontal axis exhibits the X-direction and a vertical axis exhibits the energy density distribution. FIGS. 5(B) and 5(D) show that a horizontal axis exhibits the X-direction and a vertical axis exhibits the Y1 direction.

Figure 5:
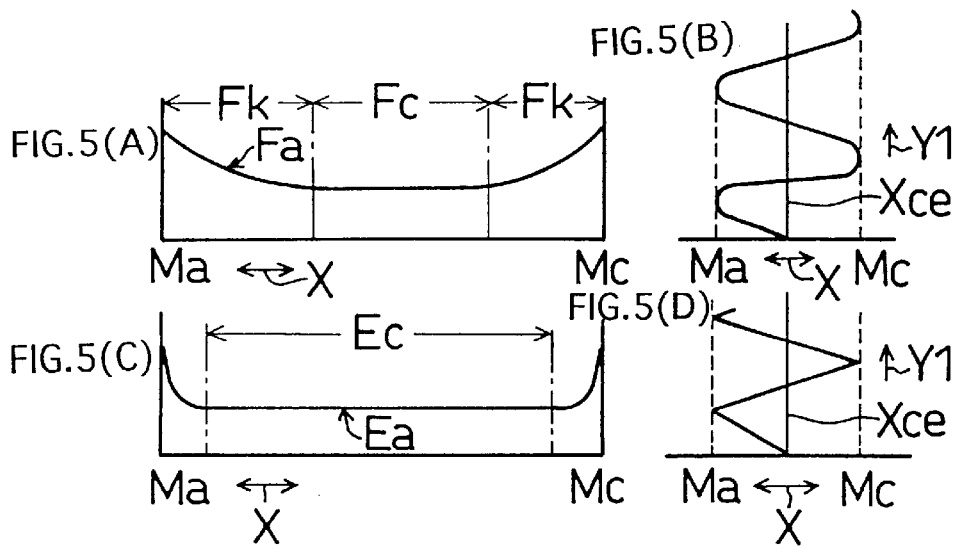
FIG. 5(A) is a graph illustrating an irradiation distribution in a X-direction with a manner that a frequency of the X-rotating mirror is excessively large.
FIG. 5(B) is a graph illustrating an irradiation distribution in a top plane view with a manner that a frequency of the X-rotating mirror is excessively large.
FIG. 5(C) is a graph illustrating an irradiation distribution in a X-direction with a manner that a frequency of the X-rotating mirror is proper.
FIG. 5(D) is a graph illustrating an irradiation distribution in a top plane view with a manner that a frequency of the X-rotating mirror is proper.

When the laser beam frequency is excessive in the X-direction, the oscillation of the X-rotating mirror per unit time is excessive in such a manner that the X-rotating mirror 21 is not reversed sufficiently. That is to say, as appreciated in FIG. 5(B), an instant beam-speed passing at the irradiated ends "Ma" and "Mc" is late in comparison with an instant beam-speed passing at a center region "Xce". Therefore, the irradiated trace comes to depict an approximate sine curve as illustrated in FIG. 5 (B). In this case, the energy density distribution in the X-direction exhibits a characteristic line "Fa" in FIG. 5(A). FIG. 5(A) shows that the irradiation energy is excessive at the irradiated ends "Ma" and "Mc", that the width of a flat region "Fc" is short, and that an unsuitable region "Fk" is large. Therefore, it is disadvantageous to level the energy density distribution in the deposited layer 55 in the X-direction.

Example 1, as shown in FIG. 2, uses a temperature sensor 30, working as a temperature detecting means, for detecting temperature of the deposited layer 55 disposed on the lift table 1. The temperature sensor 30 detects the region which is covered with the mask 12 and which is not irradiated with the laser beam, in such a fashion that the temperature sensor 30 comes into non-contact with the region. A signal detected with the temperature sensor 30 is transmitted to the controller 32 by way of a signal line 30f.

The controller 32 controls the X-galvanoscanner 22 of the mirror rotating device 10 by way of a signal line 10a, the Y-galvanoscanner 25 by way of a signal line 10b, and the laser oscillator 8 by way of a signal line 8a.

Figure 3:
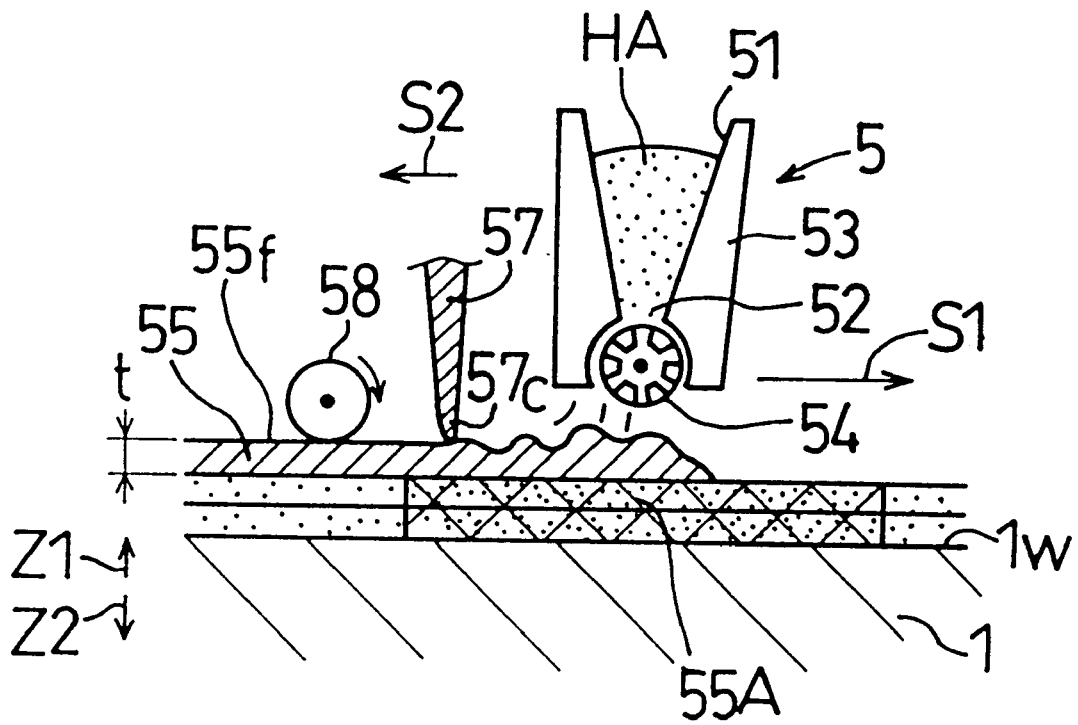
FIG. 3 is a cross-sectional view illustrating a depositing step in Example 1.

FIG. 3 illustrates the depositing apparatus 5. As shown in FIG. 3, the depositing apparatus 5 comprises a container 53 having a storing room 51 and an outlet 52, and a cutting roller 54 rotatably disposed at the bottom of the container 53. Resin coated sand "HA" is stored in the storing room 51. The resin coated sand "HA" is sand coated with thermosetting resin, phenolic resin group, which becomes hard by receiving the laser beam. The resin coated sand "HA" with the resin is approximately 50–100 μm in average diameter.

When the first driving means 3 is driven in FIG. 1, the lift table 1 of the lift apparatus 2 is raised and lowered in the height direction, the Z1, Z2 directions, so as to control the deposited layer 55 placed on the lift table 1 in the height direction Example 1 produces a three-dimensional laminated object which is a casting mold capable of including a core mold and an outer mold.

First, Example 1 carries out a depositing step. As appreciated in FIG. 3, Example 1 transfers the depositing apparatus 5 at a constant speed along a setting surface 1w of the lift table 1 in a "S1" direction with the cutting roller 54 rotating, thereby depositing the sand "HA" on the setting surface 1w. A thickness "t" of the deposited layer is selectable depending on the kinds of laminated objects; it may be in the range of 0.1–0.4 mm, in particular about 0.2 mm. It is not limited within such thickness.

Thereafter, Example 1 transfers the raking member 57 in the same direction to rake an excessive portion of the sand "HA" deposited on the setting surface 1w with a top end 57c of the raking member 57 so as to level the deposited layer 55. If necessary, it is preferable that the leveling roller 58 is rotated and transferred in the same direction so as to level an upper surface 55f of the deposited layer 55. The depositing apparatus 5 is provided with the leveling roller 58 and the raking member 57 in a body.

After the depositing step, Example 1 carries out the irradiating step. In the irradiating step, as appreciated in FIG. 2, the deposited layer 55 disposed on the lift table 1 is covered with the mask 12, and it is scann-irradiated with the laser beam "M". FIG. 2 shows that the scann-irradiation area is more extensive than the opening 11 of the mask 12.

In the irradiating step, the laser beam "M" penetrates through the opening 11 of tha mask 12 to reach the deposited layer 55 so as to heat the deposited layer 55. In the deposited layer 55, the sand portion irradiated with laser beam "M" is hardened with heat. Thus, it forms a thin solid layer 55A.

In the deposited layer 55, the sand portion interrupted with the mask 12 is not irradiated with laser beam "M"; it isn't hardened to be removable. The above-mentioned irradiating step constitutes a solid layer 55A having a plane shape corresponding to a shape of the opening 11.

After the irradiating step, the lift table 1 is lowered by a pitch amount "K" in the "Z2" direction. The pitch amount "K" is substantially equal to a thickness of the deposited layer 55.

For carrying out the next depositing step, as appreciated in FIG. 3, after the depositing apparatus 5 is returned in a "S2" direction, the depositing apparatus 5 is transferred in the "S1" direction along the solid layer 55A placed on the lift table 1 with the cutting roller 54 rotating, thereby depositing the sand "HA" on the setting surface 1w of the lift table 1 to constitute a new deposited layer 55.

Thereafter, for carrying out the next irradiating step, the new deposited layer is covered with the mask, and it is also irradiated with laser beam. In such a way, Example 1 repeats the aforesaid depositing step and the aforesaid irradiating step many times to pile solid layers so as to produce the three-dimensional laminated object.

Choice of the Irradiation Conditions

Figure 6:
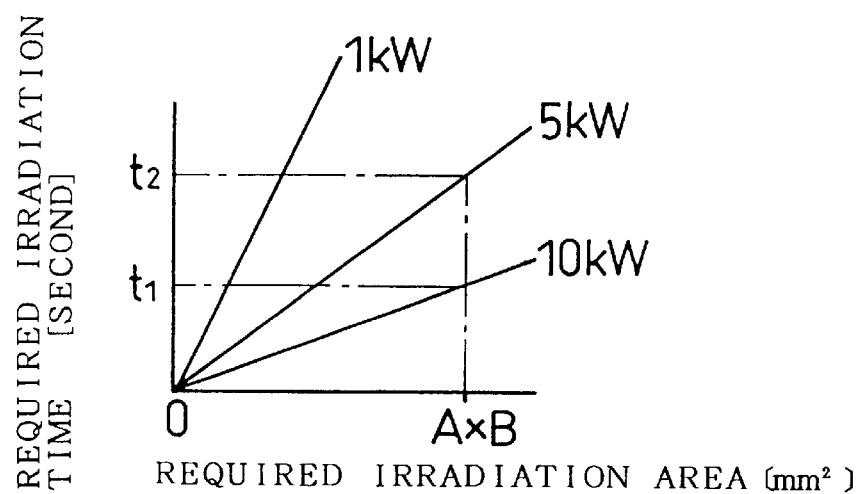
FIG. 6 is a graph schematically illustrating a relation between a required irradiation area and a required irradiation time.
Figure 7:
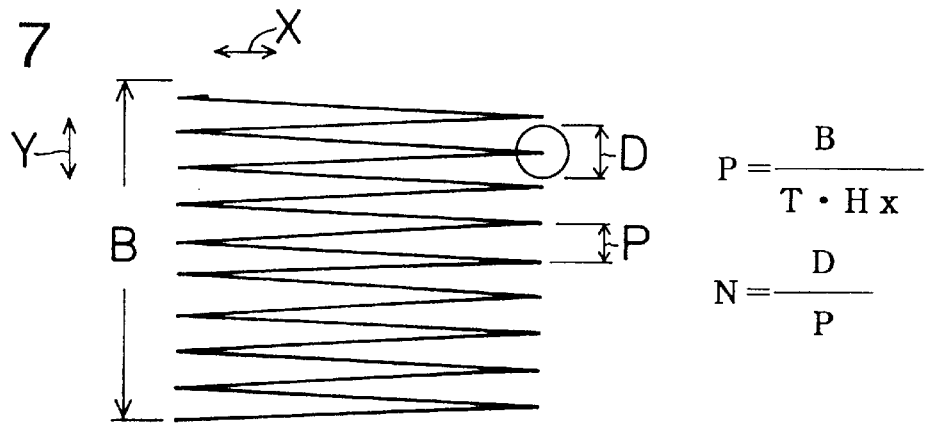
FIG. 7 is a constitutional view for explaining a scann pitch distance in a scann irradiation.

FIG. 6 exhibits a relation between a required irradiation area of the laser beam and a required irradiation time for irradiating the required irradiation area in the case of the resin coated sand. The required irradiation area of the laser beam is decided on the base of a horizontally sectioned shape of the three-dimensional laminated object, a target product. The required irradiation time "T" is decided on the required irradiation area on the basis of the characteristic line in FIG. 6. When the required irradiation area is decided on the basis of a multiplication of A [mm] and B [mm], 5 [kW] of the laser output exhibits that the required irradiation time "T" is $t_2$ [second], for example 10 seconds; 10 [kW] of the laser output exhibits that the required irradiation time "T" is $t_1$ [second] ($t_1<t_2$). A [mm] implies a length in the X-direction, and B [mm] implies a length in the Y-direction as shown in FIG. 2.

Next, a scann pitch distance "P" in the Y-direction is decided as follows: As appreciated in FIG. 7, a scann pitch distance "P" implies a distance between centers of the spot diameter in the Y-direction. A scann pitch distance "P"[mm] is decided as follows:

$$P=B/(T \cdot Hx) \quad (1)$$

where "Hx" is a frequency [Hz] for the laser beam to oscillate per second in the X-direction, and "T" is a required irradiation time [second].

Also, providing that "D" (D>P) is a spot diameter of the laser beam and "N" is a repeat cycle in which the laser beam repeatedly passes through the same location, the repeat cycle "N" is decided as follows:

$$N=D/P \quad (2)$$

For instance, when "Hx" is 50[Hz] and "T" is 10 [second], the laser beam oscillates 500 times for scann-irradiating the aforesaid required area, size of (A×B), per one cycle. Thus, when the length in the Y-direction is 500 [mm], the scann pitch distance "P" is decided as follows:

$$P=B/(T \cdot Hx)=500/(10 \times 50)=500/500=1 \text{ [mm]}$$

Thus, when the spot diameter "D" is 5 [mm], the scann pitch distance "P" is 1 [mm], the repeat cycle "N" [cycle] is decided as follows:

$$N=D/P=5/1=5 \text{ [cycle]}$$

In Example 10, the repeat cycle "N" is preferable 2–5 [cycle] for leveling the irradiation energy distribution and for obtaining the sufficient solid layer 55A according to the experimentation carried out by the present inventor.

Incidentally, when a spot diameter of the laser beam is small with the laser output kept as it is, even if irradiation energy per area is identical, the most outside surface of the deposited layer is concentratedly overheated to become overhardness and to cause a deep portion in the deposited layer to be heated insufficiently. Hence, this decreases the bonding of the solid layers so as to generate defects such as a separation and a warp of the solid layer.

On the other hand, when a spot diameter of the laser beam is large with the laser output kept as it is, a deposited layer is hard to be reached to a required heat temperature. Thus, it becomes insufficient hardness. So, Example 1 sets the spot diameter in view of such circumstances and the output of the laser oscillator 8. When the output of the laser oscillator 8 is in the range of 1–5 [kW], it is preferable to choose conditions exhibited in FIG. 8 in order to produce the sufficient laminated object.

Figure 8:
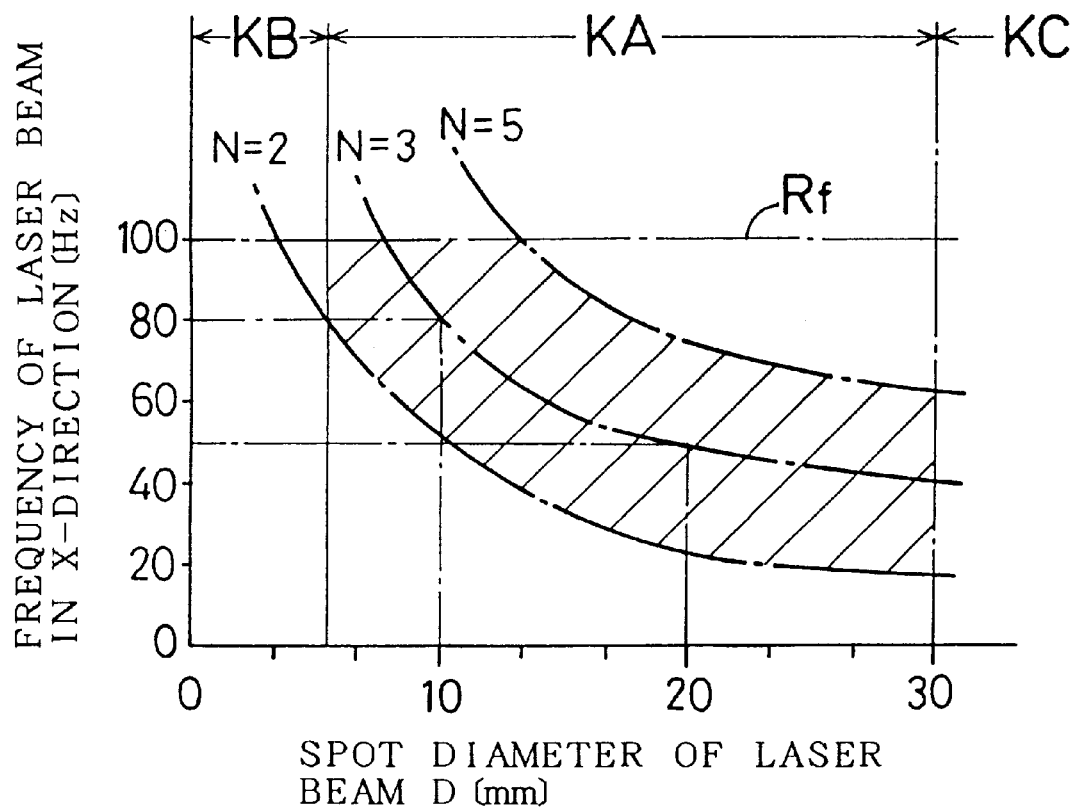
FIG. 8 is a graph illustrating a relation between a spot diameter of a laser beam and a frequency of the laser beam in the X-direction.

The horizontal axis in FIG. 8 indicates the spot diameter [mm] of the laser beam, and the vertical axis indicates the laser beam frequency [Hz] in the X-direction. The characteristic line indicated with N=2 exhibits a mode where the repeat cycle is 2 [cycle], and the characteristic line indicated with N=3 exhibits a mode where the repeat cycle is 3 [cycle]. Also, the characteristic line indicated with N=5 is in a similar situation.

When the laser beam frequency in the X-direction is larger than about 100 [Hz], a border line "Rf" in FIG. 8, the number of turns of the X-rotating mirror 21 is increased per unit time, so that the instant speed for the X-rotating mirror to turn is relatively decreased. As a result, scann irradiation is hard in depicting a triangular wave, and thereby the laser beam tends to depict a sine curve to deteriorate uniformity in energy density. Therefore, under conditions of the mirror rotating device 10 used at the present situation, it isn't preferable that the laser beam frequency in the X-direction exceeds 100 [Hz]. As understood from the characteristic lines ( N=2, N=3, N=5) in FIG. 8, a decrease of the spot diameter "D" leads to the decrease of the irradiated area of single spot, thereby requiring that the frequency of the laser beam is increased to compensate for the decrease of the spot diameter. This brings that the frequency of the laser beam approaches the border line "Rf" in FIG. 8, 100 Hz, between a triangular wave and a sine curve. Thus, this case causes the irradiated trace to depict a sine curve which disadvantageously leads to ununiformity in the irradiation energy.

Meanwhile, an increase of the spot diameter "D" leads to an increase of the irradiated area of single spot to improve production ability. This mode causes the frequency of the laser beam in the X-direction to decrease so as to decrease the number of turns of the X-rotating mirror 21 per unit time. So this mode allows the irradiated trace to depict a triangular wave or an approximate triangular wave which advantageously leads to uniformity in the irradiation energy.

On the basis of the above-mentioned conditions exhibited in FIG. 8, the region "KA", showing suitable spot diameters and frequencies, tends to produce a sufficient solid layer 55 A. The region "KB" results in overhardness in the solid layer 55A, because the spot diameter is small and the frequency is high. The region "KC" tends to cause insufficient hardness. For obtaining the sufficient solid layers 55, it is preferable to choose the hatched portion of the region "KA" in FIG. 8.

It is preferable to choose the proper frequency in the X-direction, the repeat cycle, and the proper spot diameter of the laser beam on the basis of conditions shown in FIG. 8. The data shown in FIG. 8 is decided on the basis of Example 1, thus, it may be varied in response to fluctuations in various conditions. Use of a laser oscillator having a large output allows an upper limit of the spot diameter of the laser beam to be set at 50 mm, 80 mm, 100 mm, or more for obtaining the sufficient solid layer.

In the case where the repeat cycle "N" is 3, it is preferable to choose that the frequency in the X-direction is approximately 80 [Hz] when the spot diameter of the laser beam is 10 mm. In the case where the repeat cycle "N" is 3, it is preferable to choose that frequency in the X direction is approximately 50 [Hz] when the spot diameter of the laser beam is 20 mm. Also, in the case where the repeat cycle "N" is 2, it is preferable to choose that the frequency in the X direction ia approximately 20 [Hz] when the spot diameter of the laser beam is 30 mm.

When a polygon mirror, a polyhedron mirror for rotating continuously in one direction, is used as the X-rotating mirror instead of the X-galvanoscanner 22 having oscillating mode, a scann irradiated area comes to be small although a delay in turn is improved. The X-galvanoscanner 22 having oscillating mode therefore is suitable in the case of the irradiation large area, for instance in the case of casting molds.

Figure 26:
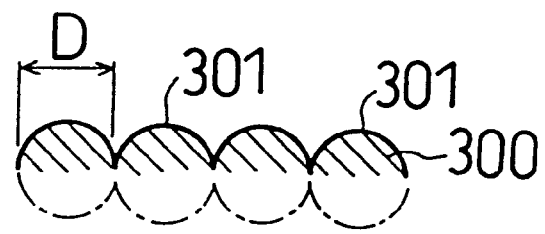
FIG. 26 is a constitutional view for explaining convex portions which are resulted from a spot diameter of a laser beam and which deteriorates shape accuracy of a laminated object concerning a prior art.

In Example 1, since the deposited layer 55, covered with the mask 12, is irradiated with the laser beam to constitute the solid layer 55A, the top plane shape of the solid layer 55A corresponds to the shape of the opening 11 of the mask 12, thereby preventing the convex portions 301 (shown in FIG. 26) from being generated and thereby preventing accuracy from being deteriorated. Thus, Example 1 improves shape accuracy at the edge of the solid layer 55A, the three-dimensional laminated object, even if the spot diameter is large.

Example 1 prevents the deposited layer 55, in particular the most outside surface of the deposited layer 55, from becoming over hardness, because Example 1 can increase the spot diameter with the edge accuracy of the laminated object being sufficient. Also, Example 1 allows the spot diameter of the laser beam to be increased, enlarging the irradiated area per single spot to shorten irradiation time and to improve production ability.

Example 1 practices a scann irradiation method using the X-rotating mirror 21 and the Y-rotating mirror 24, leveling the irradiation energy in a large irradiation area. So, Example 1 improves uniformity in the solid layer 55A so as to produce the sufficient laminated object in comparison with non-scann irradiation methods, spurious laser beam methods, such as the kalaid scope method, the segment mirror method, having a mode in which a laser beam is fixed.

Further, Example 1 allows the spot diameter of the laser beam to be increased with shape accuracy improved, thereby enlarging the required irradiation area even if the laser beam frequency in the X direction is decreased. Thus, Example 1 decrease the number of mirror-turns per unit time to be advantageous in scann irradiation depicting a triangular trace and an approximate triangular trace. So, Example 1 is also advantageous in leveling an irradiation density distribution, thereby improving uniformity in the solid layer 55A so as to the sufficient laminated object.

Incidentally, piling the solid layers 55A causes a temperature to rise in the solid layer 55A, because heat is transmitted from the irradiated solid layer 55A. Thus, a new deposited layer 55 before irradiation is also pre-heated. Also, using the heated resin coated sand causes temperature of the deposited layer 55 to rise in comparison with a normal situation. Such cases cause irradiated energy to be excessive so as to lead to overhardness of the solid layer 55A.

Example 1 detects each of deposited layers 55 in temperature with the temperature sensor 30 before irradiation. So, it inputs a detected signal into the controller 32 to carry out a correcting treatment for increasing and decreasing the irradiation energy per unit area depending on the detected signal.

Concretely, when the deposited layer 55 is higher in temperature, the controller 32 controls that output "PL" of the laser oscillator 8 is decreased and irradiation speed "VL" is increased for decreasing irradiation energy per unit area. Also, when the deposited layer 55 is lower in temperature, the controller 32 controls that output "PL" of the laser oscillator 8 is increased and irradiation speed "VL" is decreased for increasing irradiation energy per unit area.

In detecting temperature of the deposited layer 55, it is preferable to detect the region which isn't directly irradiated with the laser beam, because it is easy to detect an original temperature in the deposited layer 55 before irradiation However, it may be possible to detect the temperature in the deposited layer 55 during irradiation. It may sometimes be possible to detect temperature of the resin coated sand "HA" stored in the container 53 and to increase or decrease output "PL" of the laser oscillator 8 and irradiation speed "VL" of the laser beam.

In Example 1, the Y-direction implies the direction in which the depositing apparatus 5 is transferred, and the X direction implies the direction crossing at a right angles. Inversely, it may be possible that a X-direction implies a direction in which the depositing apparatus 5 is transferred.

Control in Example 1

Figure 9:
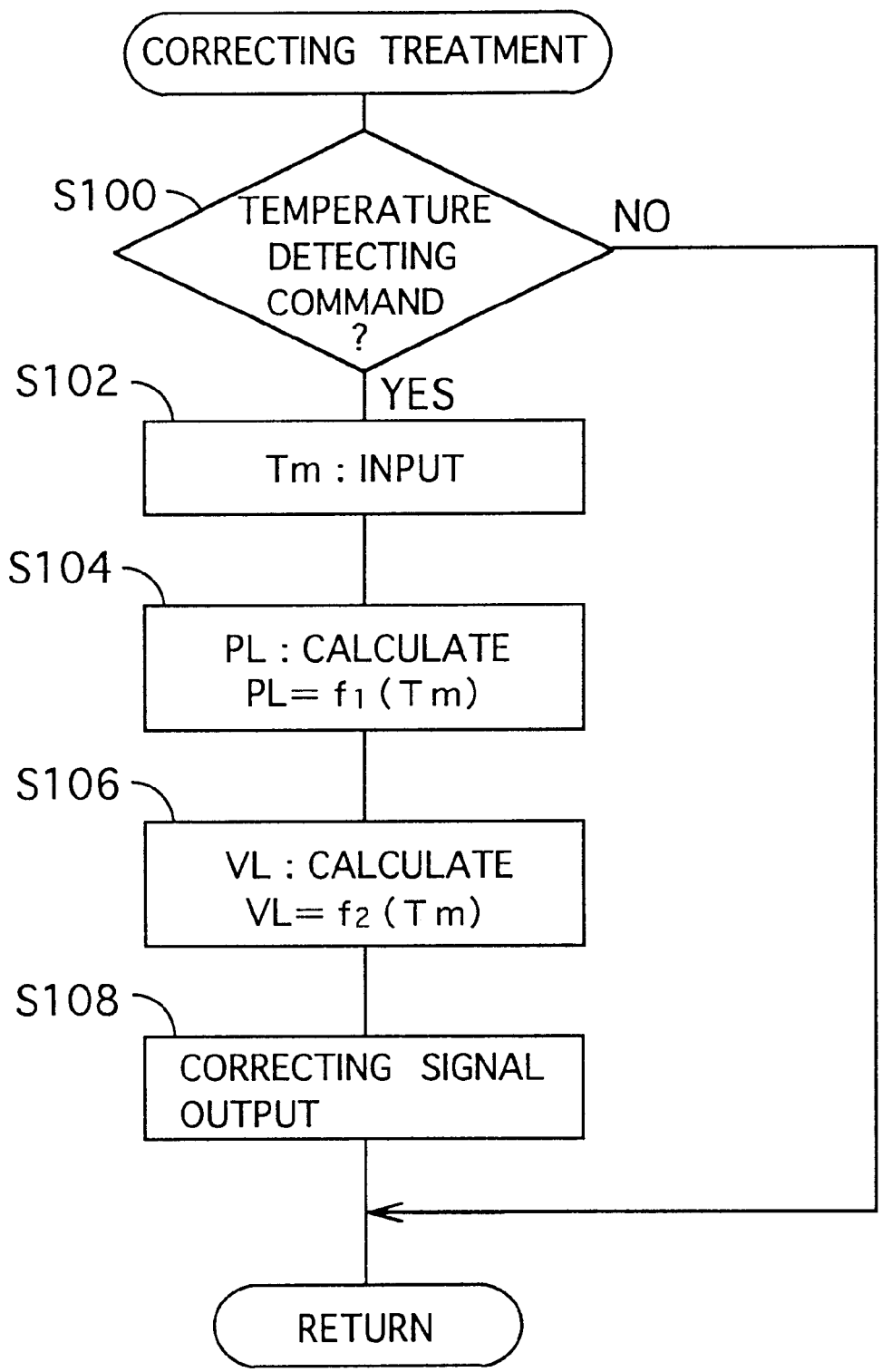
FIG. 9 is a flow chart illustrating a correcting treatment sub-routine carried out by a controller in Example 1.

FIG. 9 shows one sub-routine flowchart of a correcting treatment about the irradiation step carried out by the controller 32. In step S100, the controller 32 judges whether a temperature detecting command, which is outputted with completing the deposited layer 55, is outputted or not. When the temperature detecting command is absent, the controller 32 returns a program to the main-routine without carrying out the correcting treatment. When the temperature detecting command is present, a temperature signal "Tm" detected by the temperature sensor 30 is inputted into the controller 32 in step S102. The controller 32 calculates an output "PL" of the laser beam in step S104 and an irradiation speed "VL" in step S106 in response to the temperature signal "Tm". The output "PL" is exhibited as a numerical formula including the temperature signal "Tm", PL=$f_1$ (Tm). The irradiation speed "VL" is exhibited as a numerical formula including the temperature signal "Tm", VL=$f_2$ (Tm). The controller 32, in step S108, outputs correcting signals to a driving circuit of the laser oscillator 8, and a driving circuit of the mirror rotating device 10 so as to return to a main-routine.

Second Preferred Embodiment

A Second Preferred Embodiment is carried out like the First Preferred Embodiment. A depositing step is characterized in that a depositing apparatus comes into non-contact with a deposited layer. Thus, when the deposited layer has an over thickness portion besides a normal thickness portion, this embodiment may execute a manner that the depositing means always comes into non-contact with the deposited layer. Also, this embodiment may execute a manner that the depositing means comes into non-contact with the normal thickness portion of the deposited layer and that the thickness correcting means comes into contact with the over thickness portion so as to correct the over thickness portion. The thickness correcting means is provided on the depositing apparatus or separated from the depositing apparatus. The depositing apparatus may be in a mode having a roller for discharging the powder or grain material or in another mode spraying with a material or with a material comprising a solvent. The depositing apparatus comprises a storing container for storing the material, and a cutting roller rotatably disposed at the bottom of the storing container and adapted to discharge the material from the storing container. The cutting roller may be a roller having concave portions such as grooves.

Example 2

Figure 10:
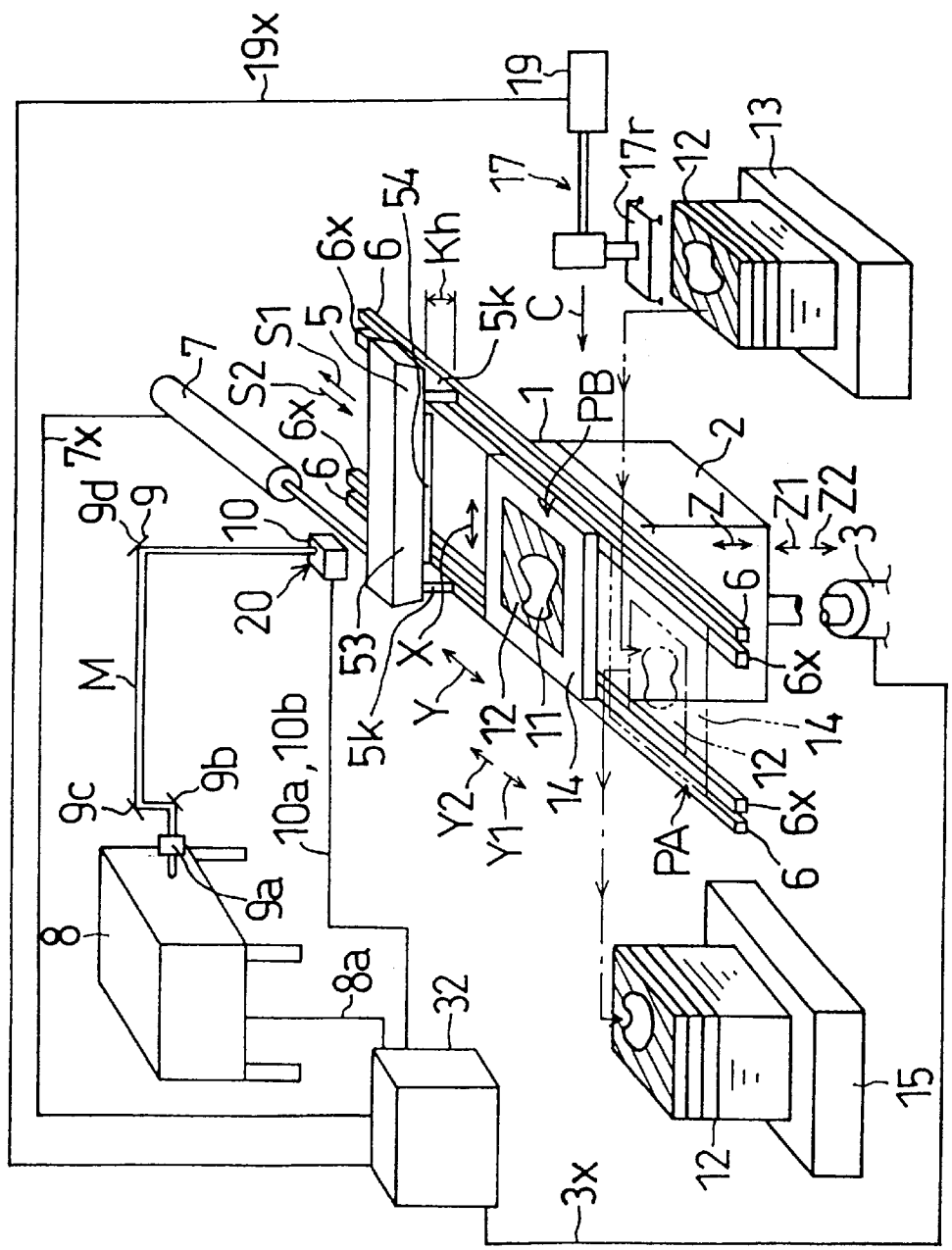
FIG. 10 is a perspective view schematically illustrating a whole construction about Example 2.

Example 2 will be hereinafter described with reference to Figures. Example 2 is the same as Example 1 in construction and advantage. FIG. 10 shows that guiding rails 6x are arranged in two rows in guiding rails 6. A maskholder 14 is a framework for holding a mask 12 removablely, it is capable of being transferred along guiding rails 6x in Y1,Y2 directions with a maskholder driving means (not shown).

For irradiation step, the maskholder 14 holds the mask 12 at a position "PA", and it is transferred along guiding rails 6x in the Y2 direction to reach a position "PB". Namely. the mask 12 reaches an upper position of a lift table 1. In this situation, the irradiation is carried out over the mask 12. After the irradiation, the maskholder 14 holding the mask 12 is withdrawn from the position "PB" to the position "PA" along the guiding rails 6x in the Y1 direction. The irradiated mask 12 held on the maskholder 14 is collected to a mask collecting stand 15 by using a mask arranging apparatus 17. A new mask 12 placed on a mask supplying stand 13 is transferred into the maskholder 14, waiting the position "PA", by using the mask arranging apparatus 17 to carry out a mask exchanging step. Again, the maskholder 14 holding the new mask 12 is transferred from the position "PA" to the position "PB" in the Y2 direction. In this situation, the irradiation is carried out over the new mask 12.

In Example 2, as shown in FIG. 10, legs 5k are attached on a lower portion of the depositing apparatus 5, so that the bottom of a depositing apparatus 5 is higher than an upper surface of the maskholder 14 disposed on the guiding rails 6x by a distance "Kh". The guiding rails 6 are disposed outside the guiding rails 6x. Thus, it is prevented that the depositing apparatus 5 interferes with and collides with the maskholder 14.

Figure 11:
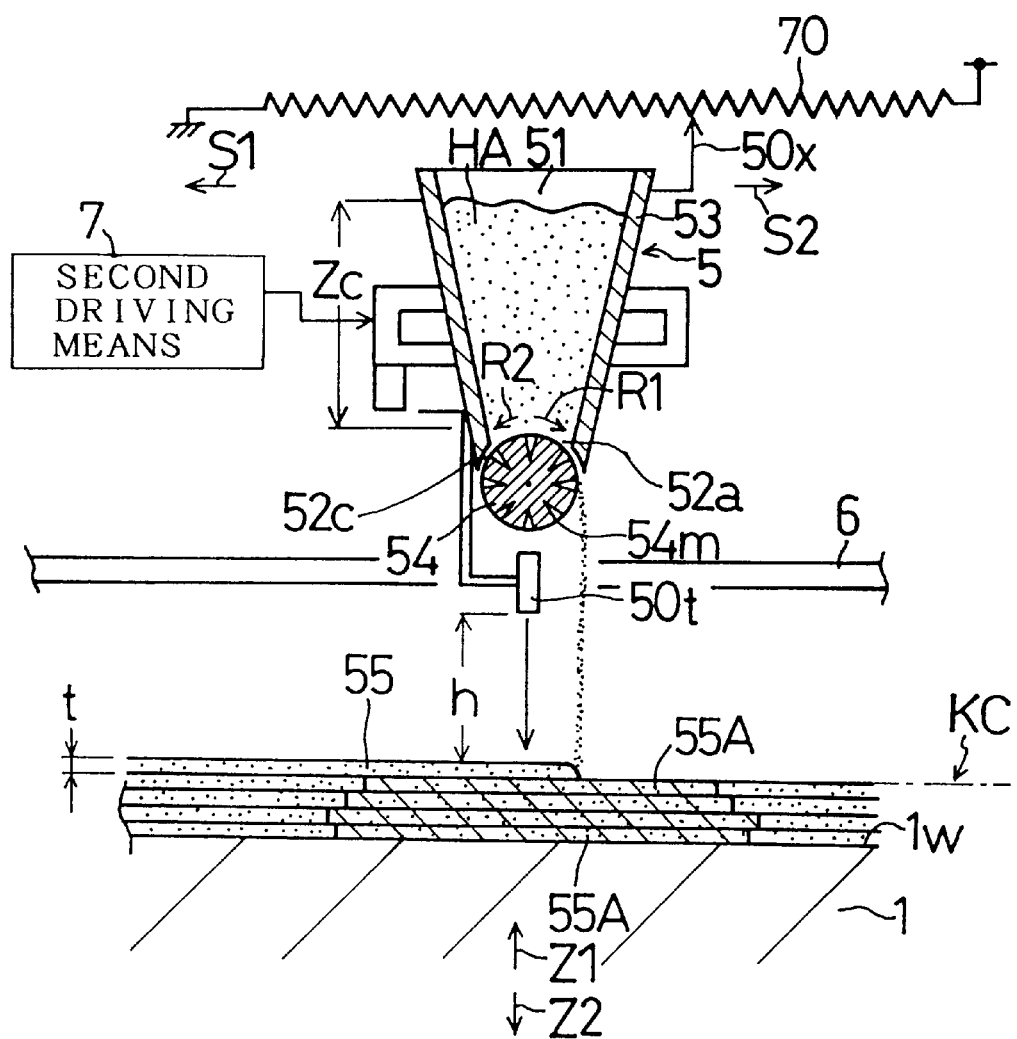
FIG. 11 is a cross-sectional view illustrating a depositing step in Example 2.

FIG. 11 shows the depositing apparatus 5 comprising a container 53 having a storing room 51 for storing resin coated sand "HA" working as the material, and outlets 52a,52c, and a cutting roller 54 rotatably disposed at the bottom of the container 53. As understood in FIG. 11, since the cutting roller 54 is disposed at the bottom of the container 53, it prevents resin coated sand "HA" from dropping spontaneously. A plurality of grooves 54m are formed at a circumferential portion of the cutting roller 54 having a horizontal axis to extend longitudinally in the X-direction.

As shown in FIG. 11, a thickness detecting sensor 50t, working as a thickness detecting means, is attached on the depositing apparatus 5. The thickness detecting sensor 50t is positioned between the outlets 52a,52c in S1,S2 directions so as to cope with transferring backward and forward. The thickness detecting sensor 50t has a light-emitting portion for emitting a detecting light such as a laser beam to the deposited layer 55, and a light-receiving portion for receiving a reflected light with the deposited layer 5, so as to measure a distance "h" between the light-emitting portion and an upper surface of the deposited layer 55.

As appreciated from FIG. 11, the height position of the depositing apparatus 5, guided with the guiding rails 6, is decided with the guiding rails 6. Thus, the height position of the thickness detecting sensor 50t is always constant even if the depositing apparatus 5 is transferred in the S1,S2 directions.

Every time the deposited layer 55 is piled, the lift table 1 is lowered by one pitch in a Z2 direction to keep a position "KC" of the setting surface 1w of the lift table 1 constant in the height position. Thus, the detection of the above-mentioned distance "h" (shown in FIG. 11) allows the thickness of the deposited layer 55 to be detected with non-contact.

As appreciated from FIG. 11, a linear potentiometer 70 is disposed for working as a distance detecting means for detecting a distance transferred in the S1,S2 directions. The depositing apparatus 5 has a detecting portion 50x capable of sliding along the linear potentiometer 70 so as to detect a transferred distance in the S1,S2 directions.

As appreciated from FIG. 11, the depositing apparatus 5, is decided in the height direction with the guiding rails 6, thereby positioning the cutting roller 54 above the most upper deposited layer 55 placed on the lift table 1. In this situation, the depositing apparatus 5 is transferred forward and backward for depositing sand in such a manner that the depositing apparatus 5 comes into non-contact with the deposited layer 55. Thus, the guiding rails 6 and the second driving apparatus 7 work as a non-contact transferring means.

Example 2 produces a casting mold, a three-dimensional laminated object. In producing the laminated object, first, a depositing step is carried out. As appreciated from FIG. 11, while rotating the cutting roller 54 in the R1 direction, the depositing apparatus 5 is transferred forward at a constant speed along the setting surface 1w of the lift table 1 in the S2 direction, corresponding to the R1 direction being equal to the rotating direction of the cutting roller 54; thereby depositing the sand on the setting surface 1w.

When the depositing apparatus 5 is transferred forward in the S2 direction, the thickness detecting sensor 50t emits a detecting light such as a laser beam, or the like, thereby detecting a distance "h" (shown in FIG. 11) between the thickness detecting sensor 50t and the deposited layer 55 and to measure a thickness of the deposited layer 55. In such a case, the detecting portion 50x slides on the liner potentiometer 70 to measure a transferred distance in the S2 direction, thereby measuring a thickness distribution in the deposited layer 55.

After the above-mentioned depositing step, the maskholder 14 waiting at the position "PA" in FIG. 10 is inserted into the position "PB" in the Y2 direction so as to cover the deposited layer 55 with a new mask 12.

Next, the irradiating step is carried out. In this step, the mirror rotating device 10 emits the laser beam "M" to execute scann-irradiation to the deposited layer 55 covered with the mask 12. Scann-irradiation area is carried out larger than the area of the opening 11 of the mask 12, (A×B).

In the irradiating step, the laser beam M penetrates through the opening 11 of the mask 12 to reach and to heat the deposited layer 55. In the deposited layer 55, the portions which are irradiated with the laser beam becomes hard with heat; so, the sand adjacent to each other is bonded to constitute a thin solid layer 55A. Meanwhile, in the deposited layer 55, portions which aren't irradiated becomes insufficient in hardness to be removable by an after-treatment. Thus, the irradiation produces the solid layer 55A having a plane shape corresponding to the shape of the opening 11.

After irradiation step, the lift table 1 is lowered in Z2 direction by one pitch substantially corresponding to the thickness "t" of the deposited layer 55. Thus, the upper surface of the deposited layer 55 is constant in the height position each time. Thereafter, for the next depositing step, while rotating the cutting roller 54 in the R2 direction, the depositing apparatus 5 is transferred backward along the solid layer 55A on the lift table 1 in the S1 direction, corresponding to the R2 direction being equal to the rotating direction of the cutting roller 54; thereby depositing the sand to make a new deposited layer 55.

When the depositing apparatus 5 is transferred backward in such a way, the thickness detecting sensor 50t emits a detecting light such as a laser beam, etc. thereby measuring a thickness of the deposited layer 55. In such a case, the detecting portion 50x of the depositing apparatus 5 slides on the liner potentiometer 70 to measure a transferred distance of the depositing apparatus 5, thereby measuring a thickness distribution of the deposited layer 55.

After the depositing step, the mask exchanging step is carried out again to cover the deposited layer with the mask 12. Afterward, the new deposited layer 55 is to be irradiated.

Figure 12:
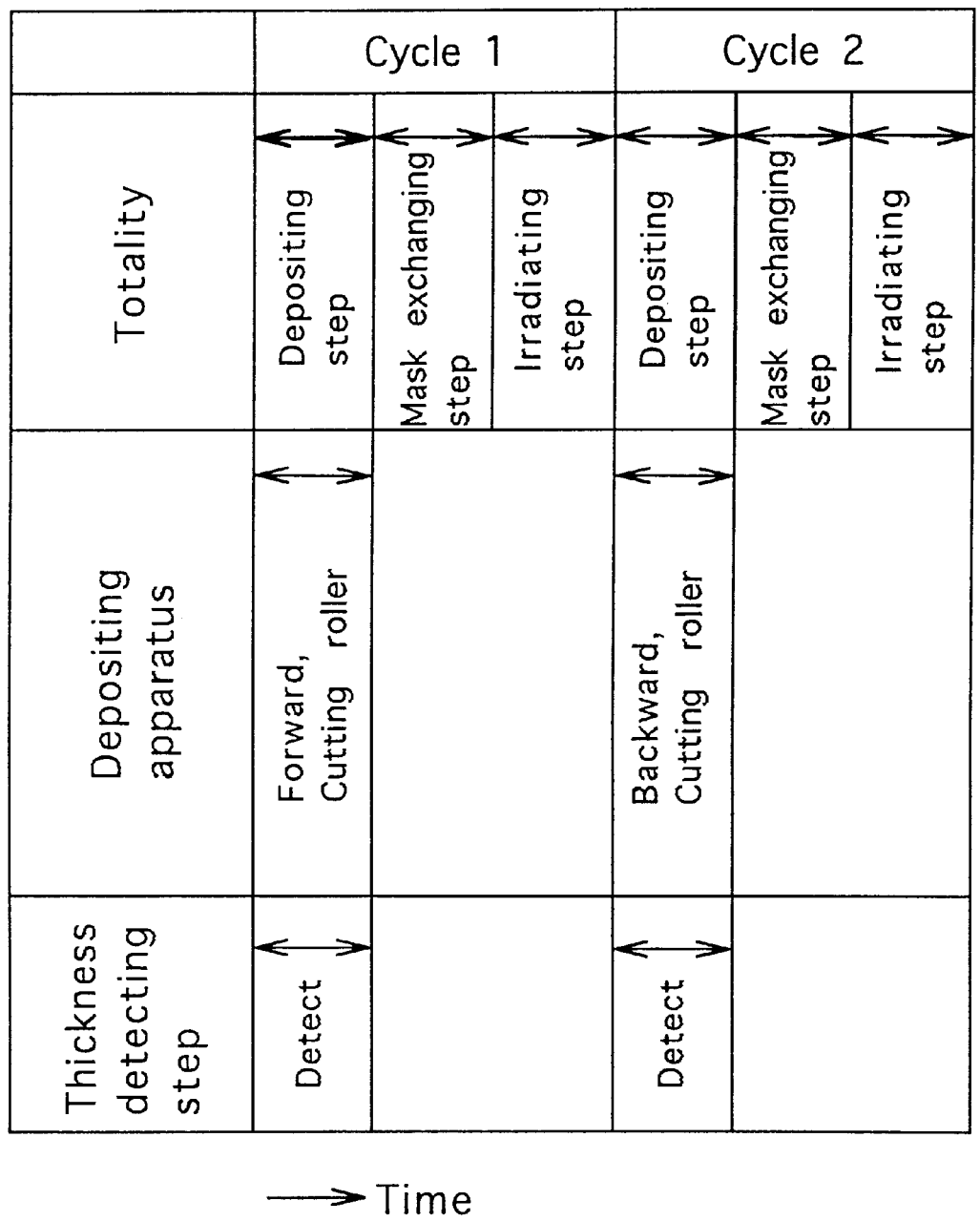
FIG. 12 is a cycle diagram illustrating an step order in Example 2.

Example 1 repeatedly carries out the depositing step, the mask exchanging step and irradiating step many times in sequence to produce the three-dimensional laminated object. FIG. 12 shows the diagram with totality of steps, a depositing step using the depositing apparatus 5, and the thickness detecting step for detecting the thickness of the deposited layer.

Control in Example 2

Figure 13:
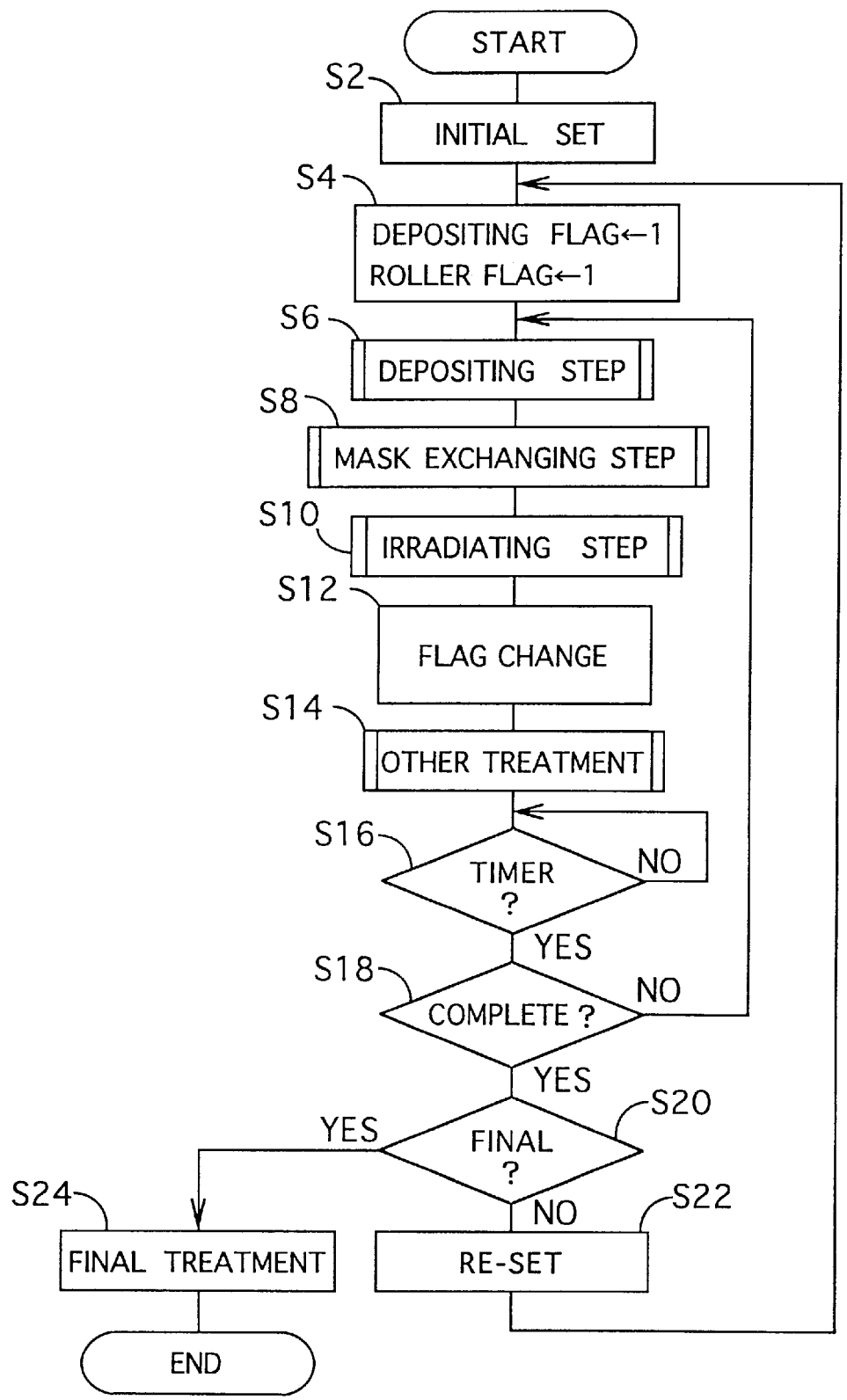
FIG. 13 is a flow chart illustrating a main-routine carried out by a controller in Example 2.

FIG. 13 shows one main-routine flowchart about a control treatment executed with the controller 32. The controller 32 executes an initial set in step S2 to set a depositing flag and a roller flag to "1" in step S4. When such flags are at "1", the controller indicates that layer 55 is to be an odd number, that the depositing apparatus 5 is transferred forward in the S2 direction, and that the cutting roller 54 is rotated in the R1 direction. When such flags are at "0", the controller indicates that the deposited layer 55 is to be an even number, that the depositing apparatus 5 is transferred backward in the S1 direction, and that the cutting roller 54 is inversely rotated in the R2 direction. The controller 32 executes the depositing step depending on such flags in step S6, the mask exchanging step in step S8, and the irradiating step in step S10. It executes the flag changing step in step S12. Namely, "1" of such flags are changed to "0", and "0" of such flags are changed to "1". The controller 32 executes the other treatment in step S14, and waits for a prescribed time in step S16.

In step 18, the controller 32 judges whether the laminated object is completed or not. When incompletion, the controller 32 returns to step S6 to repeat the above-said operations. When completion, the controller 32 judges whether a final treatment signal is outputted or not. Absence of the final treatment signal outputs a re-setting command in step S22 for producing the next object so as to return to step S4. Presence of the final treatment signal advances the program from step S20 to step S24 to execute the final treatment.

Figure 14:
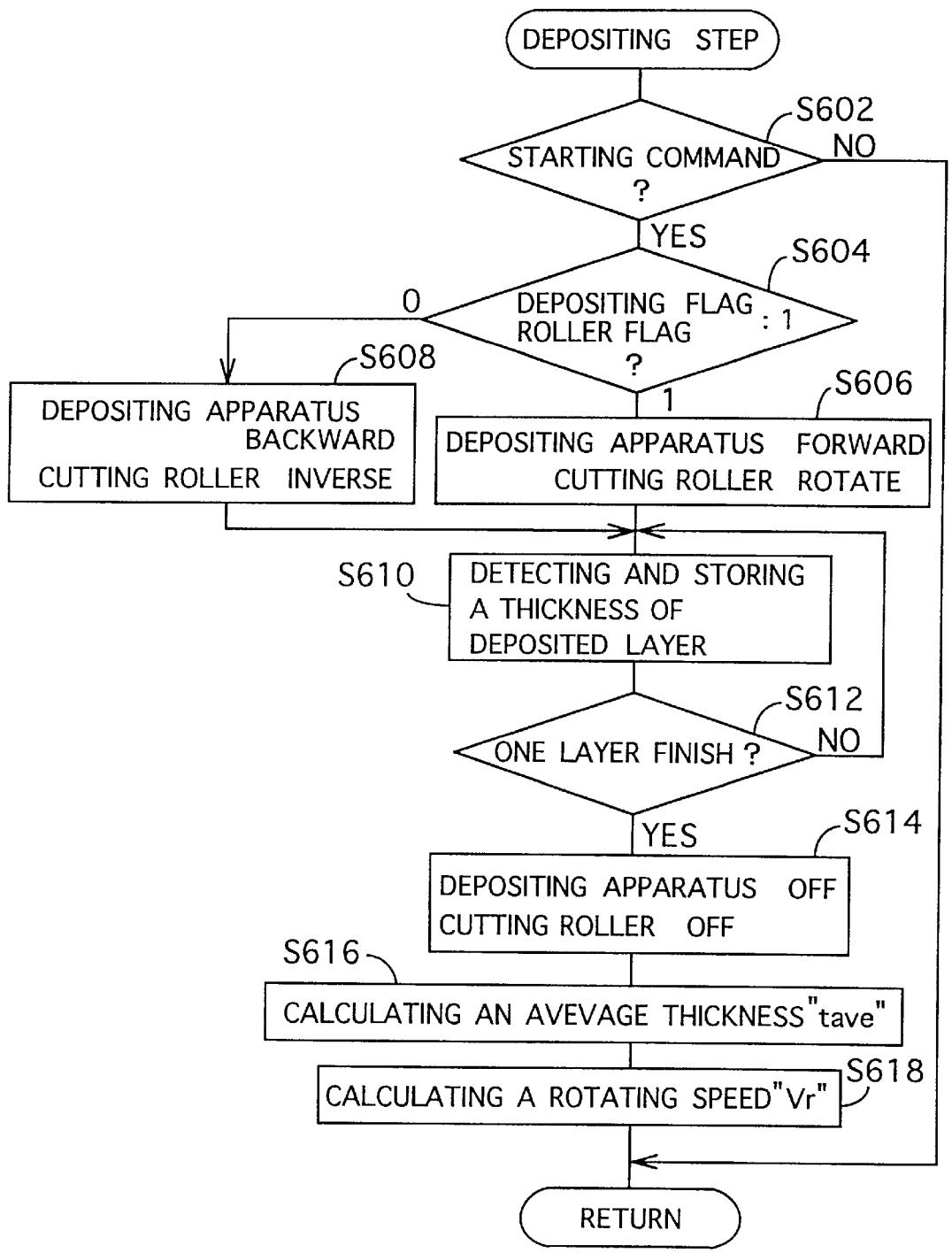
FIG. 14 is a flow chart illustrating a sub-routine the depositing step in Example 2.

FIG. 14 shows the above-said depositing sub-routine. The controller 32 judges whether a starting command to start a depositing step is outputted or not. Absence of the command leads the program to return to the main-routine. Presence of the command leads the program to step S604 to judge whether the depositing flag and the roller flag are "1" or not. "1" of such flags implies that the deposited layer 55 to be formed is an odd number. Thus, it implies that the second driving means 7 is driven for transferring the depositing apparatus 5 forward in the S2 direction and that the cutting roller 54 is driven in the R1 direction. When the deposited layer 55 to be formed is the first layer, the cutting roller 54 is rotated at a prescribed rotational speed. "0" of such flags implies that the deposited layer 55 to be formed is an even number and step S604 progresses to step S608.

Thus, it implies that the second driving means 7 is inversely driven for transferring the depositing apparatus 5 backward in the S1 direction and that the cutting roller 54 is inversely driven in the R2 direction.

In step S610, the controller works the thickness detecting sensor 50t so as to measure the thickness "t" of the deposited layer 55, stores the results about thickness "t" to a memory; so, it judges whether the depositing step for forming one layer is finished or not. Absence of the finish returns the program from step S612 to step S610 to continue the thickness detecting treatment. Presence of the finish advances the program from step S612 to step S614 to cut off operation of the depositing apparatus 5 and the cutting roller 54. In step S616, the controller calculates an average thickness "$t_{ave}$" to calculate a rotating speed "Vr" about the cutting roller 54 for forming the next deposited layer 55, in response to the average thickness "$t_{ave}$", and to return to the main-routine.

In Example 2, the rotating speed "Vr" of the cutting roller 54 is set as a numerical formula including the average thickness "$t_{ave}$", Vr=f ($t_{ave}$). Namely, in view of "$t_{ave}$", Example 2 decides the rotating speed "Vr" of the cutting roller 54 to rotate the cutting roller 54 for forming the next deposited layer 55.

Various causes generates fluctuations in thickness of the deposited layer 55. The height "Zc" (shown in FIG. 11) of the resin coated sand "HA" stored in container 53 of the depositing apparatus 5, and abrasion in the cutting roller 54 sometimes influence an amount per second for discharging the resin coated sand "HA". In such a case, when "$t_{ave}$" is thin, this Example increases the rotational speed "Vr" to enlarge a discharging amount of the resin coated sand "HA". Whereas "$t_{ave}$" is thick, this Example decreases the rotational speed "Vr" to reduce a discharging amount per second of the resin coated sand "HA". This cancels the fluctuations in thickness of the deposited layer 55, thereby advantageously improving dimension accuracy in the laminated direction. It is possible that such cancel is realized in the next one layer or next plural layers.

Example 2 keeps the deposited layer 55 and the depositing apparatus 5 to be in non-contact with each other. Thus, Example 2 prevents the formed layer from being peeled and damaged to suppress deterioration in shape accuracy of laminated objects and to advantageously produce laminated objects, as different from the conventional method in which the raking member 400 and the rotating roller 500 always come into contact with the deposited portion.

Figure 27:
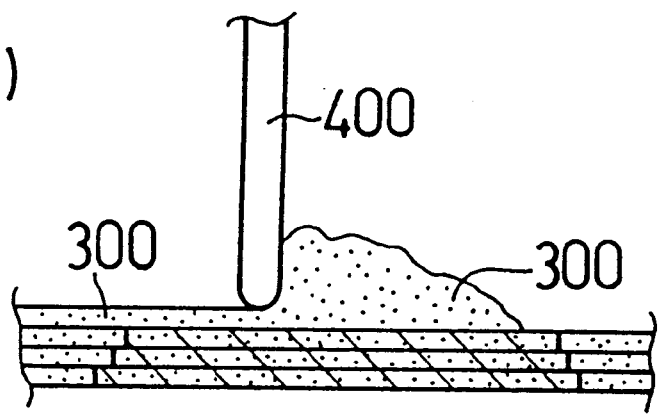
FIG. 27 is a constitutional view concerning a prior art showing a manner that a raking member rakes resin coated sand.
Figure 28:
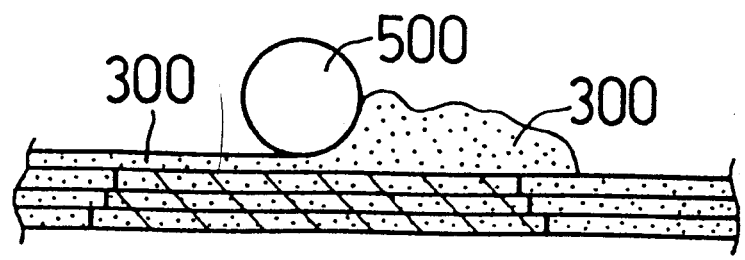
FIG. 28 is a constructive view concerning a prior art showing a manner that a rotating roller levels resin coated sand.

Since Example 2 prevents the layer from being peeled and damaged, it permits a transferring speed of the depositing apparatus, depositing speed, and producing speed to increase so as to improve production ability, as compared with the conventional technique in shown in FIGS. 27,28. Example 2 transfers the depositing apparatus, while rotating the cutting roller 54, thereby discharging the resin coated sand "HA" in such a manner that the depositing apparatus 5 comes into non-contact with the deposited sand "HA". Thus, the cutting roller 54 smoothly discharges the resin coated sand "HA" in the container 53 little by little. Example 2 therefore is advantageous in decreasing fluctuations in thickness of the deposited layer 55 and in improving shape accuracy of laminated objects.

Incidentally, when a rotational speed of the cutting roller 54 is excessively small, the upper surface of the deposited layer 55 billows sometimes, because the plural grooves 54m are intermittently formed so as to discharge the sand intermittently. In such a case, Example 2 realizes that a rotational speed of the cutting roller 54 is sufficiently larger than a transferring speed of the depositing apparatus 5 in response to intervals of the grooves 54m, thereby decreasing an influence of intermittent discharge and improving uniformity in depositing the resin coated sand "HA".

(Vr/Va) in Example 2 may be in the range from 2 to 3. (Vr/Va), however, isn't limited to such range. Va is a transferring speed the depositing apparatus 5.

Example 2 alters the rotational direction of the cutting roller 54 depending on a transferring direction of the depositing apparatus 5. That is to say, as appreciated from 11, when the depositing apparatus 5 is transferred forward in the S2 direction, the cutting roller 54 is rotated in the R1 direction. When the depositing apparatus 5 is transferred backward in the S1 direction, the cutting roller 54 is rotated in the R2 direction. Hence, Example 2 is advantageous in using both of transfers forward and backward during the depositing step, thereby abolishing return time of the depositing apparatus 5. Thus, it is advantageous in shortening cycle time, increasing a forming speed, and production ability.

The fluctuations in thickness of the deposited layer 55 may deteriorates accuracy in the piling direction of the laminated objects because of the accumulation of fluctuations. In particular, in the case of large-scale laminated objects in which the number of piling layers are 100 and more, or 1000 and more. Example 2 measures the thickness of the deposited layer 55 with the thickness detecting sensor 50t, and it corrects a rotational speed "Vr" of the cutting roller 54 depending on detected results. Thus, even when the thickness of the deposited layer 55 is varied, Example 2 corrects thickness of the next deposited layer 55 to suppress the accumulation of fluctuations, thereby improving shape accuracy of laminated objects in the piling direction. When the thickness detecting sensor 50t detected a physical amount about the thickness of the deposited layer 55, the thickness detecting sensor 50t doesn't come into contact with the deposited layer 55. Thus, Example 2 prevents the deposited layer 55 from being peeled and damaged, suppressing fluctuations in thickness of the deposited layer 55, and improving accuracy of laminated objects.

Example 3

Figure 15:
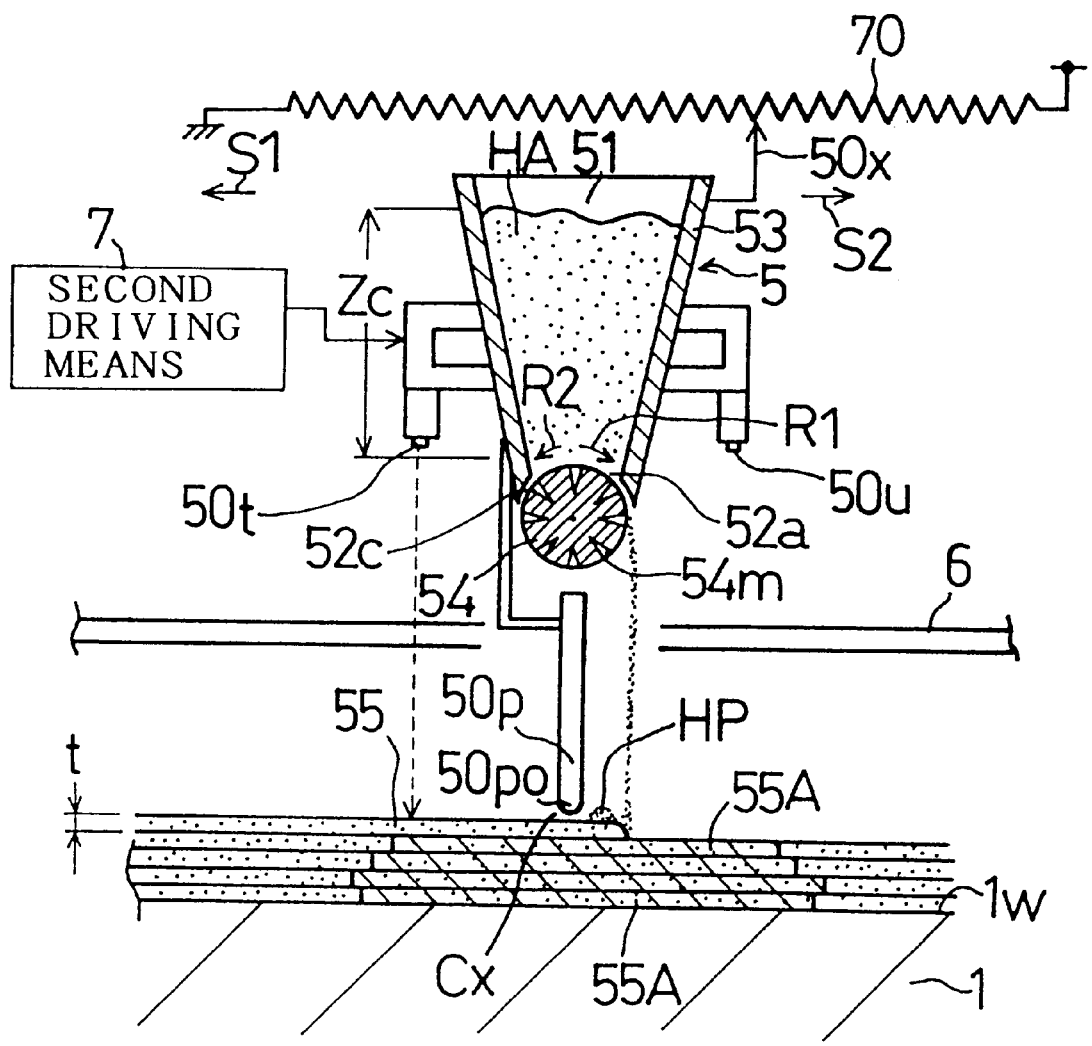
FIG. 15 is a cross-sectional view illustrating a depositing step about Example 3.

FIG. 15 shows a major portion about Example 3. Example 3 is the same as Example 2 in construction and advantage. Thickness of a deposited layer 55 is generally in a normal thickness; however, over thickness portions are sometimes locally generated in the deposited layer 55.

A depositing apparatus 5 about Example 3 in shown in FIG. 15 is provided with a raking member 50p. The raking member 50p is disposed between outlets 52a,52c in S1,S2 directions, because of coping with both of transfers forward and backward. In Example 3, a gap "Cx" is constituted between the deposited portion of the deposited layer 55 and a top end 50po of the raking member 50p. So, the deposited layer 55 is kept in a non-contact situation. Thus, Example 3 prevents the layer from being peeled and damaged to suppress deterioration of the shape accuracy of the laminated objects and to improve accuracy of the laminated objects.

If an over thickness portion "HP"( shown in FIG. 15) is locally generated in the deposited layer 55, the top end 50po of the raking member 50p rakes and corrects the over thickness portion "HP" so as to improve accuracy of laminated objects.

The depositing apparatus 5 concerning Example 3 is provided with a thickness detecting sensor 50u in addition to a thickness detecting sensor 50t.

Other Example

Example 2 shown in FIG. 11 and Example 3 shown in FIG. 15 indicate a mode in which the cutting roller 54 is rotated in the R1 direction when the depositing apparatus 5 is transferred forward in the S2 direction, and in which the cutting roller 54 is rotated in the R2 direction when the depositing apparatus 5 is transferred forward in the S1 direction. Other Examples aren't limited within this mode. An Example utilizes the mode in which the cutting roller 54 is rotated in the R2 direction when the depositing apparatus 5 is transferred forward in the S2 direction, and in which the cutting roller 54 is rotated in the R1 direction when the depositing apparatus 5 is transferred forward in the S1 direction Example 4

Further, Example 4 will be hereinafter described with reference to FIGS. 16 to 18. Example 4 is the same as Example 1 in construction and advantage.

Figure 16:
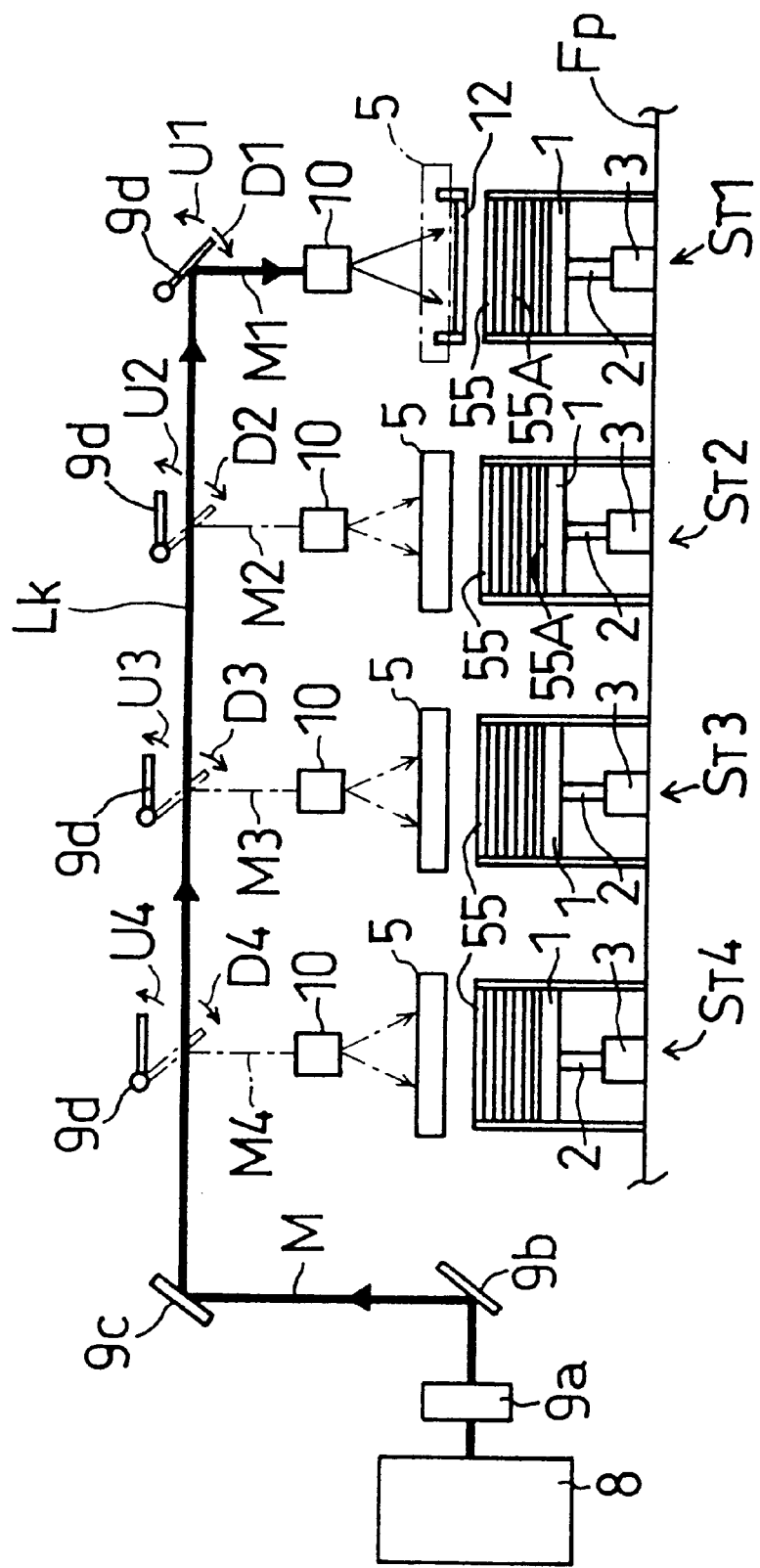
FIG. 16 is a side elevation view schematically illustrating a manner that a plurality of stations in Example 4 are disposed in series.

FIG. 16 shows that a lift apparatus 2 has a lift table 1 and a first driving means 3 and that a plurality of lift apparatuses 2 are disposed in series on a floor "Fp". Namely, a plurality of station (hereinafter referred to as station $S_\tau$) are disposed in series. A laser oscillator 8 works as a common irradiating apparatus used in stations $S_\tau 1$–$S_\tau 4$. A plurality of mirror rotating devices 10 are disposed above each of lift apparatuses 2. Depositing apparatuses 5 are disposed in the vicinity of each of the lift apparatuses 2. Mirrors 9d in the stations $S_\tau 1$–$S_\tau 4$ are to swing. Swing of mirrors 9d in U1–U4 directions gives to escape from a beam passage Lk. Swing of mirrors 9d in D1–D4 directions gives to reflect a laser beam.

As shown in FIG. 16, each of mirrors 9d in the stations $S_r 2$–$S_r 4$ escape in the U2–U4 directions, and mirror 9d in the station $S_r 1$ is swung in the D1 direction to reflect a laser beam. In this situation, when the laser oscillator 8 emits the laser beam M, the laser beam M is reflected downward with the mirror 9d in the station $S_r 1$ as the laser beam M1. The laser beam M1 reaches the mirror rotating device 10 in the station $S_r 1$. As a result, the deposited layer 55 placed on the lift table 1 in the station $S_r 1$ is irradiated. In this time, the other stations $S_r 2$–$S_r 4$ execute a depositing step or a mask exchanging step.

After the irradiating step is finished in the station $S_r 1$, the mirror 9d in the station $S_r 2$ is swung in the D2 direction to reflect a laser beam. In this situation, the laser beam M emitted with the oscillator 8 is reflected downward with the mirror 9d in the station $S_r 2$ as the laser beam M2. The laser beam M2 reaches the mirror rotating device 10 in the station $S_r 2$. As a result, the deposited layer 55 placed on the lift table 1 in the station $S_r 2$ is irradiated with the laser beam M2. In this time, the other the stations $S_r 3$, $S_r 4$, $S_r 1$ execute a depositing step or a mask exchanging step.

After the irradiating step is finished in the station $S_r 2$, the mirror 9d in the station $S_r 2$ escapes in the U2 direction and the mirror 9d in the station $S_r 3$ is swung in the D3 direction to reflect a laser beam. In this situation, the laser beam M emitted with the oscillator 8 is reflected downward with the mirror 9d in the station $S_r 3$ as the laser beam M3. The laser beam M3 reaches the mirror rotating device 10 in the station $S_r 3$. As a result, the deposited layer 55 on the lift table 1 in the station $S_r 3$ is irradiated with the laser beam M3. In this time, the other the stations $S_r 4$, $S_r 1$, $S_r 2$ execute a depositing step or a mask exchanging step After the irradiating step is finished in the station $S_r 3$, the mirror 9d in the station $S_r 3$ escapes in the U3 direction and the mirror 9d in the station $S_r 4$ is swung in the D4 direction to reflect a laser beam. In this situation, the laser beam M emitted with the oscillator 8 is reflected downward with the mirror 9d in the station $S_r 4$ as the laser beam M4. The laser beam M4 reaches the mirror rotating device 10 in the station $S_r 4$. As a result, the deposited layer 55 placed on the lift table 1 in the station $S_r 4$ is irradiated with the laser beam M4. In this time, the other the stations $S_\tau 1$, $S_\tau 2$, $S_\tau 3$ execute a depositing step or a mask exchanging step.

Sequence swing of mirror 9d in the stations $S_\tau 1$–$S_\tau 4$ produces laminated objects in the station $S_\tau 1$–$S_\tau 4$ independently. Therefore, each of the mirrors 9d in the stations $S_\tau 1$–$S_\tau 4$ works as a distributor for distributing the laser beam M among in the stations $S_\tau 1$–$S_\tau 4$.

Figure 17:
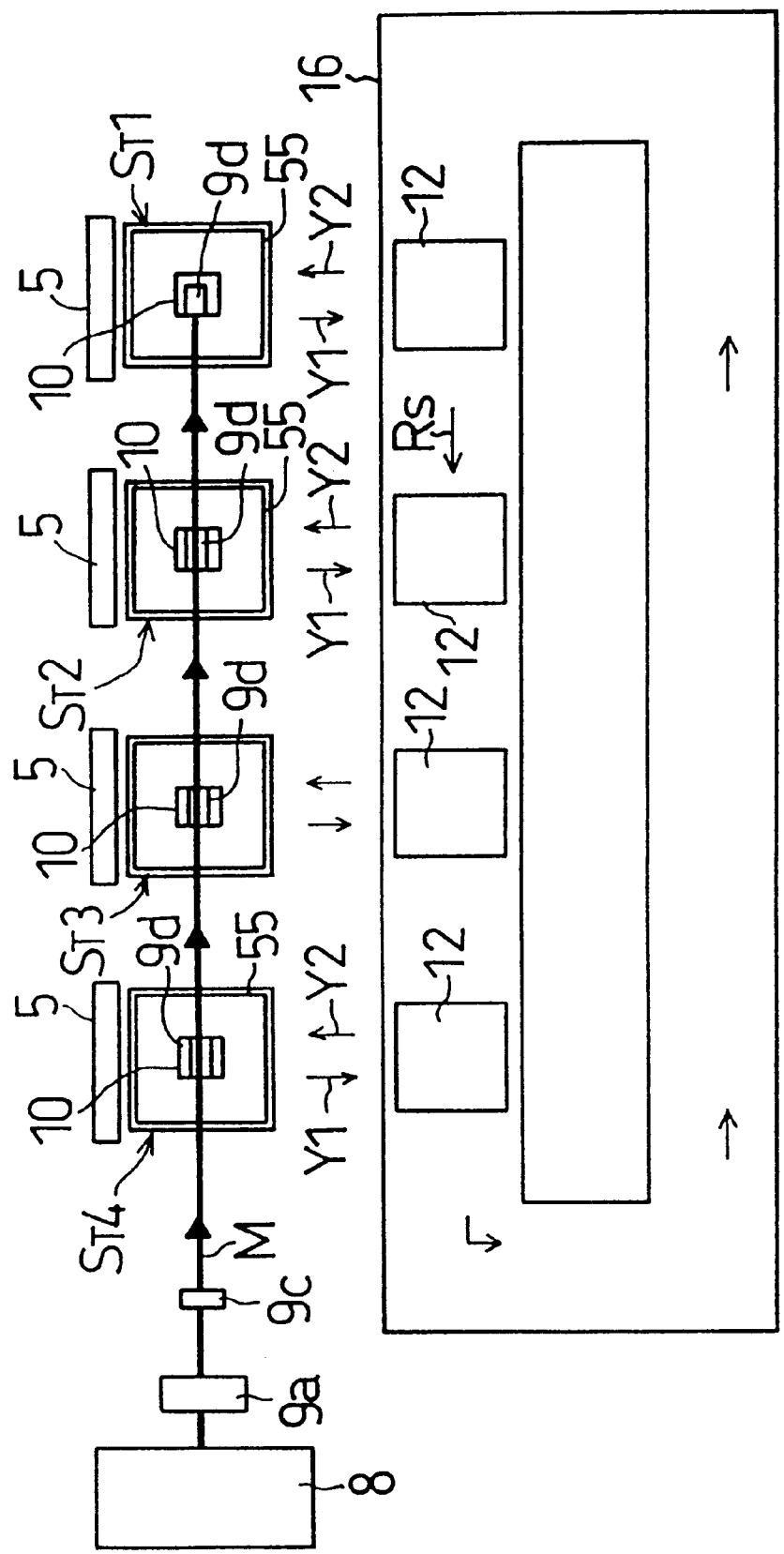
FIG. 17 is a top plane view schematically illustrating a manner that the stations in Example 4 are disposed in series.

FIG. 17 shows a top plane view of the major portion concerning FIG. 16. A mask circulating apparatus 16 is disposed for circulating the mask 12 among the stations $S_\tau 1$–$S_\tau 4$. The mask circulating apparatus 16 uses conveyor means such as belts and chains. The mask 12 used in the station $S_\tau 1$ is withdrawn from the station $S_r 1$ in the Y1 direction in FIG. 17 to be placed on the mask circulating apparatus 16. It is frther transferred in the Rs direction to be inserted into the station $S_r 2$ in the Y2 direction. The mask 12 used in the station $S_\tau 2$ is withdrawn from the station $S_r 2$ in the Y1 direction to be placed on the mask circulating apparatus 16. It is further transferred in the Rs direction to be inserted into the station $S_\tau 3$. In such a way, the mask 12 is transferred as follows: the station $S_\tau 1 \rightarrow$ the station $S_\tau 2 \rightarrow$ the station $S_\tau 3 \rightarrow$ the station $S_\tau 4 \rightarrow$ the station $S_\tau 1$. Namely, the mask 12 is shared among the stations $S_\tau 1$–$S_\tau 4$.

Figure 18:
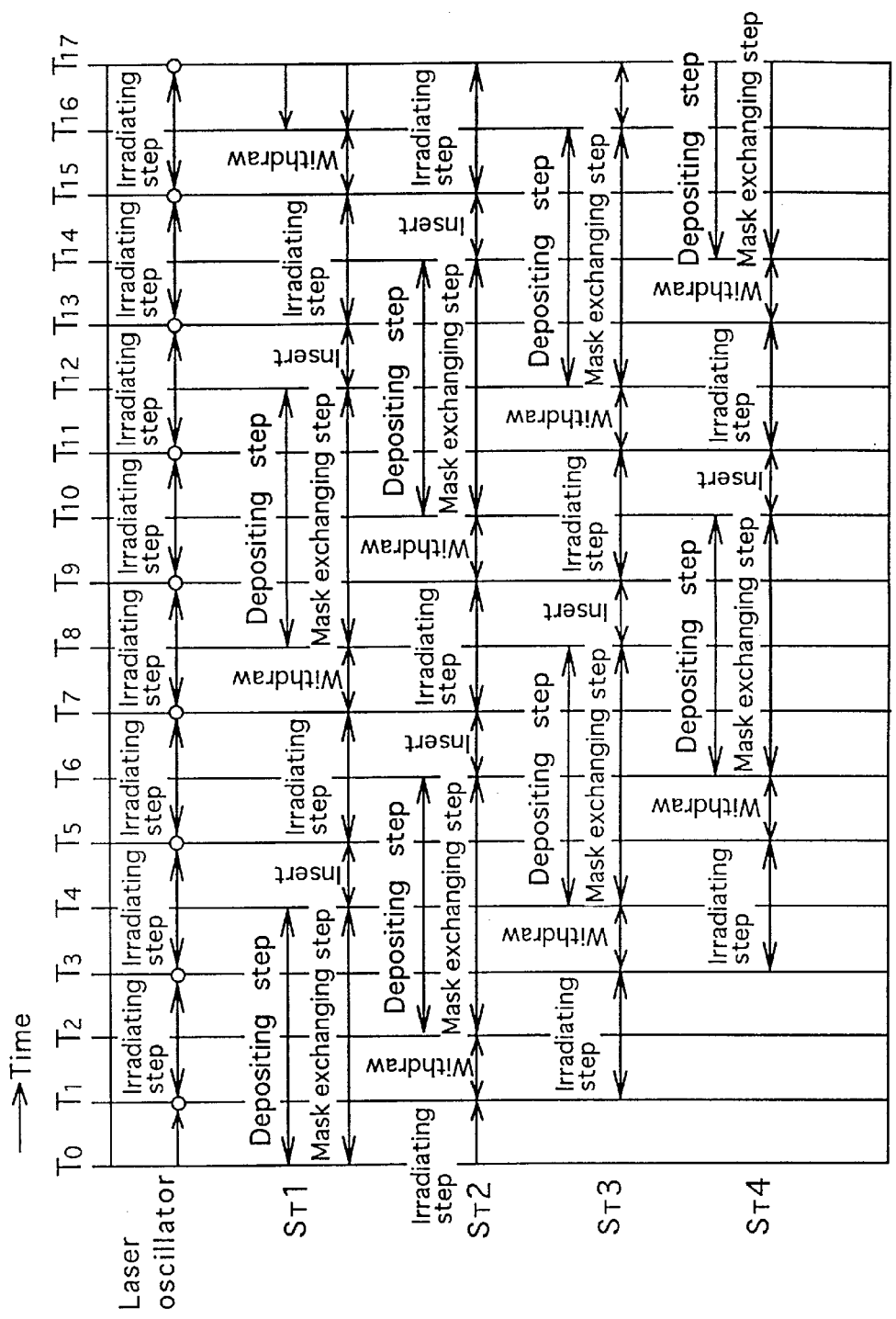
FIG. 18 is a cycle diagram illustrating operational cycles.

FIG. 18 shows operational cycles in the stations $S_\tau 1$–$S_\tau 4$ concerning this example shown in FIGS. 16 and 17. FIG. 18 shows that the irradiating step is executed between T1–T3, between T3–T5, between T5–T7, between T7–T9, etc. At the station $S_\tau 1$, the depositing step and the mask exchanging step are executed between T0–T4, the mask is inserted into the station $S_\tau 1$ between T4–T5, the irradiating step is executed between T5–T7, and the irradiated mask 12 is withdrawn from the station $S_r 1$ between T7–T8.

Thereafter, at the station $S_\tau 1$, the depositing step and the mask exchanging step are executed between T8–T12. Thus, according to FIG. 18, at the station $S_\tau 2$ being adjacent to the station $S_\tau 1$, the depositing step and the mask exchanging step are executed between T2–T6, the mask to be irradiated is inserted into the station $S_\tau 2$ between T6–T7, the irradiating step is executed between T7–T9, the irradiated mask 12 is withdrawn from the station $S_\tau 2$ between T9–T10.

Thereafter, the depositing step and the mask exchanging step are again executed. Similar steps shown in FIG. 18 are executed in the other stations $S_\tau 3$, $S_\tau 4$.

As shown in FIG. 18, when the station $S_\tau 1$ executes the irradiating step between T5–T7, the stations $S_\tau 2$, $S_\tau 3$ execute the depositing step, insertion of the mask 12, and the mask exchanging step.

When the station $S_r 1$ executes the depositing step and the mask exchanging step between T8–T12, the stations $S_\tau 2$, $S_\tau 3$ execute the irradiating step.

Since this example contains the plural stations $S_\tau 1$, $S_\tau 2$, $S_\tau 3$, $S_\tau 4$, it simultaneously executes an operation including the irradiating step and another operation including the depositing step and the mask exchanging step, so that it improves production ability.

Since this example contains one laser oscillator 8 shared among the stations $S_\tau 1$–$S_\tau 4$, the irradiating ability of the laser oscillator 8 is effectively utilized. Thus, this example produces the laminated objects while economizing the number of laser oscillators 8 being extremely expensive, and it suppresses equipment costs and improves production ability.

Example 5

Figure 19:
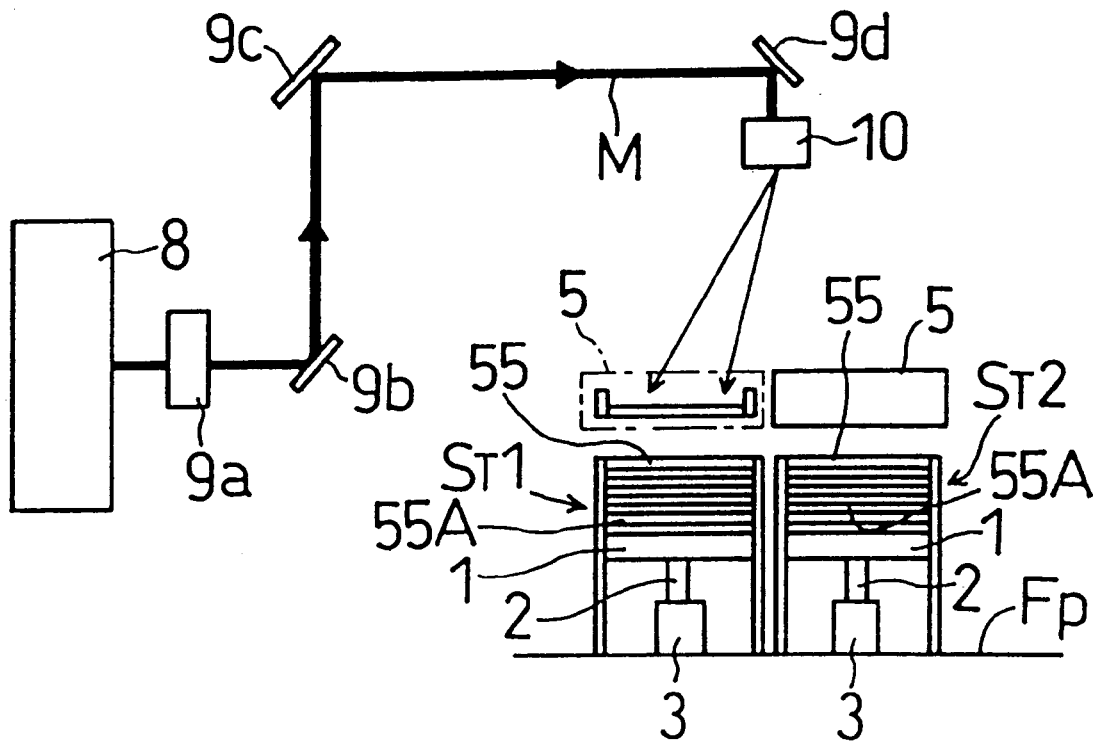
FIG. 19 is a side elevation view schematically illustrating a manner that a plurality of stations in Example 5 are disposed.

FIGS. 19 to 22 show Example 5. Example 5 is the same as Example 1 in construction and advantage. As shown in FIG. 19, two lift apparatuses 2, having a lift table 1 and a first driving means 3, are disposed side by side on a floor "Fp". Each of stations $S_\tau 1$, $S_\tau 2$ is provided with a depositing apparatus 5. A laser oscillator 8 and a mirror rotating device 10 are shared among the two stations $S_\tau 1$, $S_\tau 2$ so as to work as a common irradiating apparatus.

The laser oscillator 8 is extremely expensive. Further, the mirror rotating device 10, working as a distributor, including a X-galvanoscanner 22 and a Y-galvanoscanner 25, is extremely expensive. Example 5 shows that the two stations $S_\tau 1$, $S_\tau 2$ share the laser oscillator 8 and the mirror rotating device 10, thereby producing the laminated object, while economizing the number of laser oscillators 8 and the number of mirror rotating device 10. This suppresses equipment costs with production ability improved.

Figure 20:
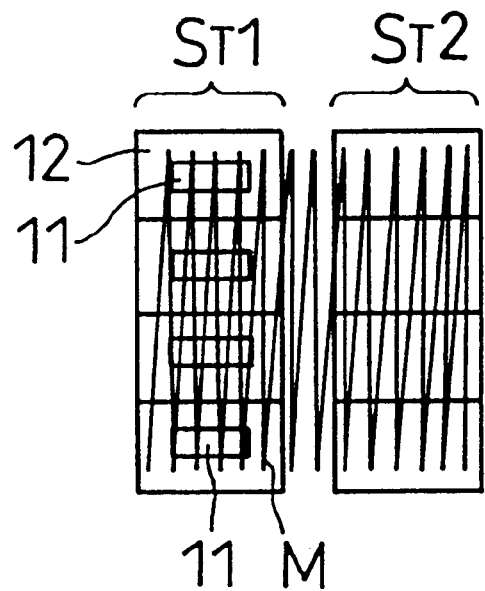
FIG. 20 is a top plane view schematically illustrating a manner that deposited layers on the stations in Example 5 are irradiated with the laser beam.

Example 5 executed a depositing step in the station $S_\tau 2$ while executing a irradiating step in the station $S_\tau 1$; Example 5 executed the depositing step in the station $S_\tau 1$ while executing the irradiating step in the station $S_\tau 2$. FIG. 20 indicates the irradiated trace with the laser beam M in the stations $S_\tau 1$, $S_\tau 2$.

Figure 21:
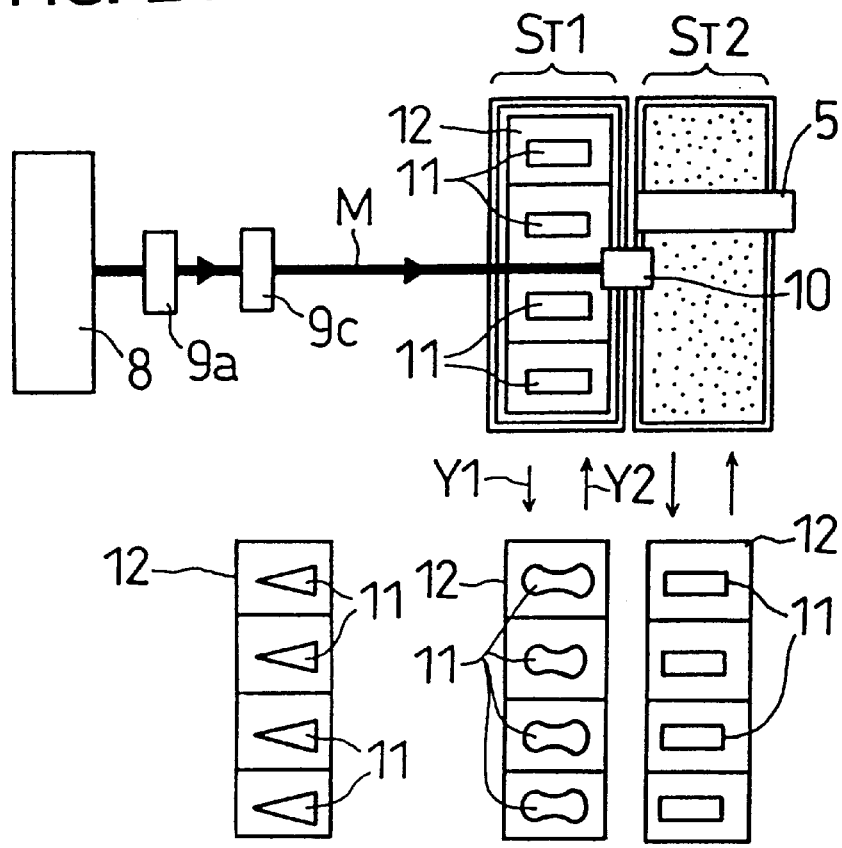
FIG. 21 is a top plane view schematically illustrating a manner that the stations in Example 5.
Figure 22:
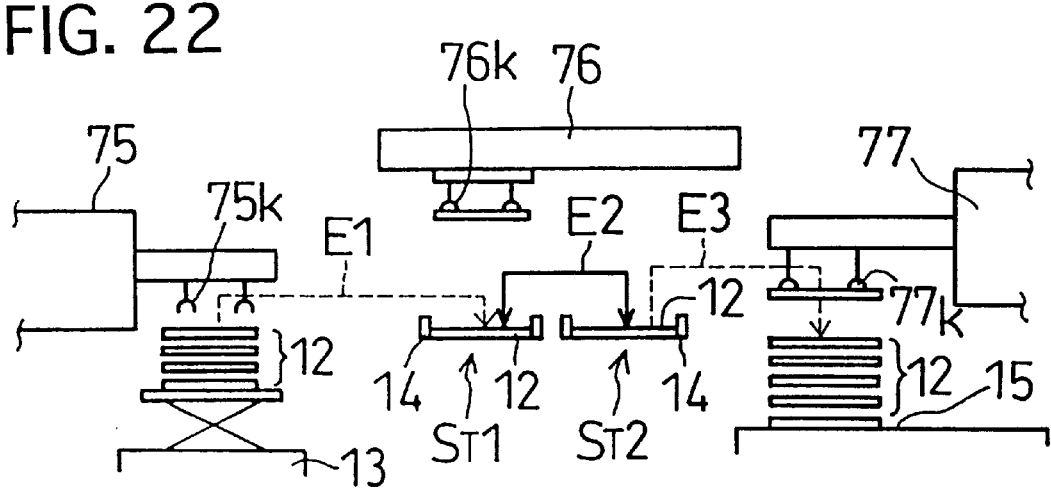
FIG. 22 is a side elevation view schematically illustrating a manner that a mask is exchanged in the stations in Example 5.

FIG. 21 shows that the mask 12 is to produce four laminated objects to has four openings 11. Each station St therefore produce four laminated objects to improve production ability. As shown in FIG. 22, Example 5 contains three mask exchanging apparatuses 75,76,77. The mask exchanging apparatus 75 transfers the mask 12 with an absorbing potion 75k in a E1 direction from a mask supplying stand 13 to a maskholder 14 waited in the station $S_\tau 1$.

The mask exchanging apparatus 76 transfers the mask 12 with an absorbing potion 76k in a E2 direction from the maskholder 14 waited in the station $S_\tau 1$ to another maskholder 14 waited in the station $ST_2$. The mask exchanging apparatus 77 transfers the mask 12 with an absorbing potion 77k in a E3 direction from a maskholder 14 waited in the station $ST_2$ to a mask collecting stand 15.

Example 6

Figure 23:
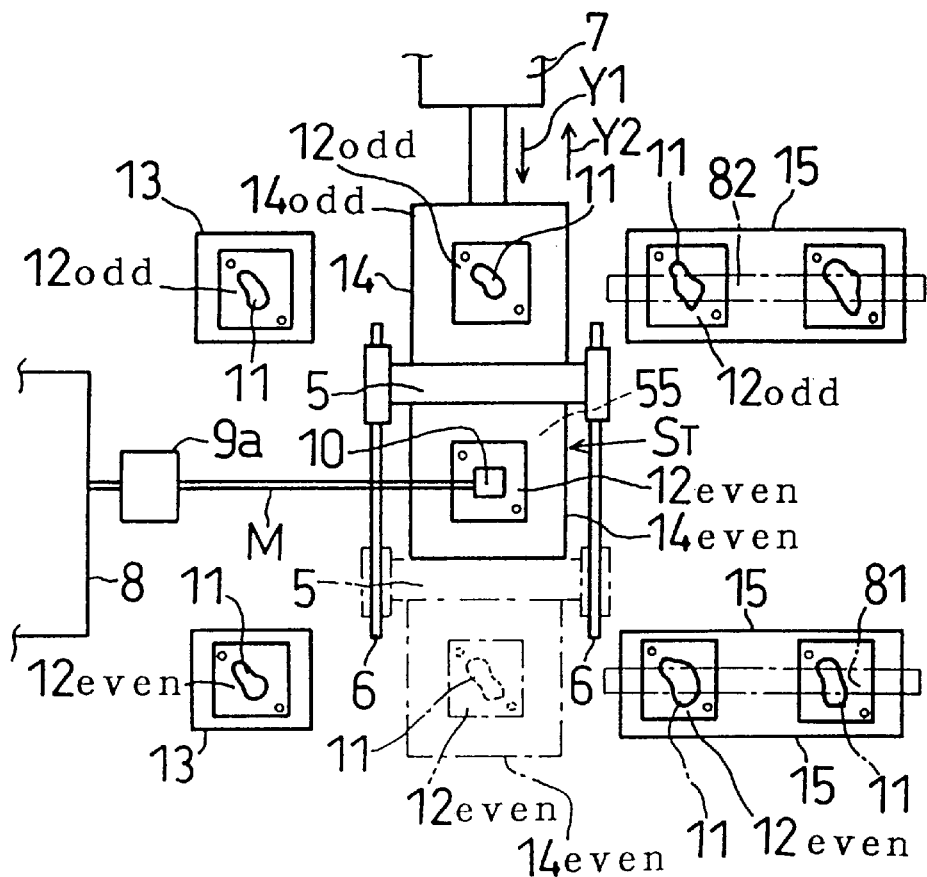
FIG. 23 is a top plane view schematically illustrating a manner that an irradiating step is carried out by using an even-numbered-mask in Example 6.
Figure 24:
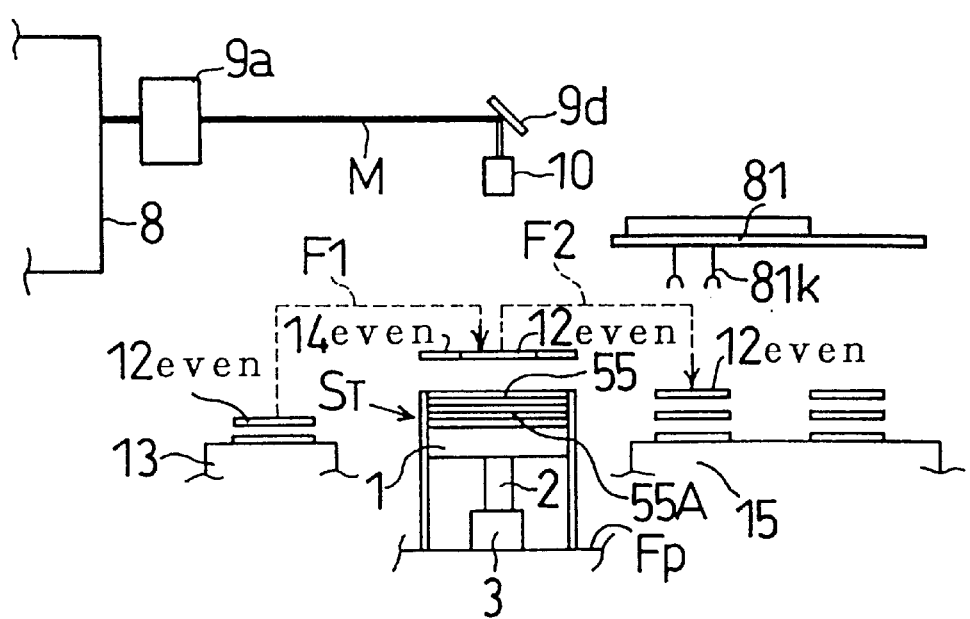
FIG. 24 is a side elevation view schematically illustrating a treatment for exchanging an even-numbered-mask.
Figure 25:
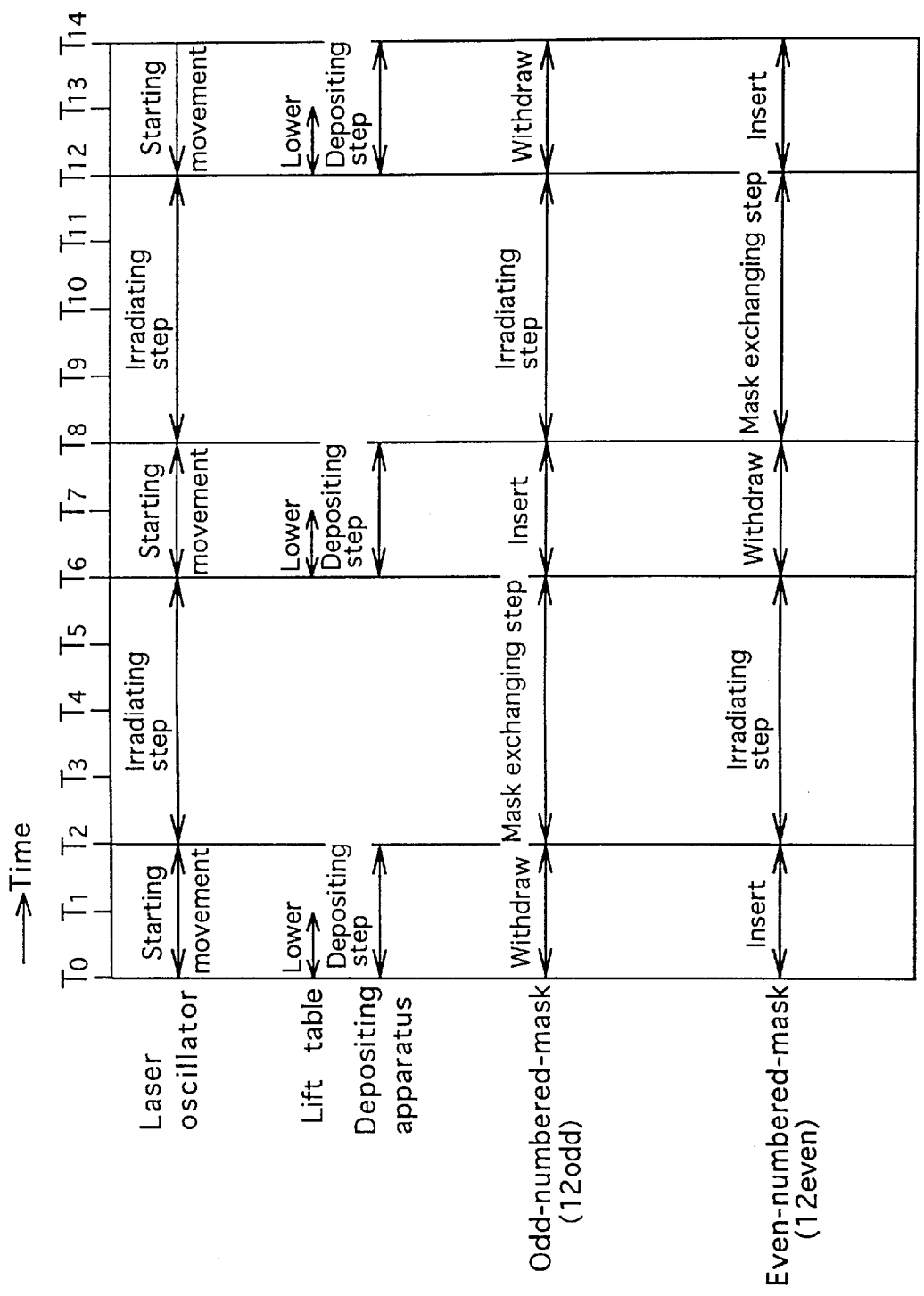
FIG. 25 is a cycle diagram illustrating operational cycles in Example 6.

FIGS. 23–25 show Example 6 which is the same as Example 4 in construction and advantage. The laminated object producing method is to pile a large number of solid layers 55A in sequence in the thickness direction. The laminated object therefore is constituted by piling solid layers 55A in sequence; an odd numbered layer→an even numbered layer→an odd numbered layer→an even numbered layer.

A maskholder 14 concerning Example 6 includes: a maskholder $14_{odd}$ for holding an odd-numbered-mask $12_{odd}$ for forming the odd-numbered solid layer; and a maskholder $14_{even}$ for holding an even-numbered mask $12_{even}$ for forming the even-numbered solid layer.

The maskholder 14 is provided with a depositing apparatus 5, and it is transferred by a second driving means 7 in Y1,Y2 directions shown in FIG. 23.

The second driving means 7 is to transfer the maskholder 14 with the depositing apparatus 5 in the Y1,Y2 directions, thereby working as a maskholder driving means. As appreciated from FIG. 23, when the maskholder 14 is transferred in the Y2 direction in FIG. 23, the even-numbered-mask $12_{even}$ held with the maskholder $14_{even}$ is inserted into a station $S_\tau$ so as to face a deposited layer 55 on a lift table 1, and the odd-numbered-mask $12_{odd}$ held with the maskholder $14_{odd}$ is withdrawn from the station $S_\tau$ not to face the deposited layer 55.

Inversely, when the maskholder 14 is transferred in the Y1 direction in FIG. 23, the odd-numbered-mask $12_{odd}$ held with the maskholder $14_{odd}$ is inserted into the station $S_\tau$ to face the deposited layer 55 on the lift table 1, and the even-numbered-mask $12_{even}$ held with the maskholder $14_{even}$ is withdrawn from the station $S_\tau$ not to face the deposited layer 55.

In Example 6, as shown in FIG. 23, there is an even-numbered-mask exchanging apparatus 81 for exchanging the even-numbered-mask $12_{even}$ at one side of the lift table 1. At the other side of the lift table 1, there is an odd-numbered-mask exchanging apparatus 82 for exchanging the odd-numbered-mask $12_{odd}$. As shown in FIG. 24, the even-numbered-mask exchanging apparatus 81 contains an absorbing portion 81k for absorbing the mask 12 with vacuum, and it contains a transferring function that the mask $12_{even}$ placed on a mask supplying stand 13 is transferred onto the maskholder $14_{even}$ in a F1 direction; and another transferring function that the mask $12_{even}$ on the maskholder $14_{even}$ is transferred onto a mask collecting stand 15 in a F2 direction. The odd-numbered-mask exchanging apparatus 82 is the same as in the even-numbered-mask exchanging apparatus 81 in construction and function.

While executing the irradiating step by use of the even-numbered-mask $12_{even}$ held with the maskholder $14_{even}$, Example 6 executes the mask exchanging step for exchanging the odd-numbered-mask $12_{odd}$ disposed on the maskholder $14_{odd}$. Example 6 therefore improves production ability.

FIG. 25 shows operational cycles in Example 6. As appreciated in FIG. 25, between T0–T2, the controller executes a starting movement in which the laser beam M is returned to the starting point, and it lowers the lift table 1 and executes the depositing step by using the depositing apparatus 5. Further, between T0–T2, the controller withdraws the odd-numbered-mask $12_{odd}$ from the station $S_\tau$, and inserts the even-numbered-mask $12_{even}$ into the station $S_\tau$. Between T2–T6, the controller executes the irradiating step by using the even-numbered-mask $12_{even}$ and by emitting the laser beam M from the laser oscillator 8, while executing the mask exchanging step of the odd-numbered-mask $12_{odd}$.

Between T6–T8, the controller also executes a starting movement of the laser beam, and it lowers the lift table 1 and executes the depositing step by using the depositing apparatus 5. Further, between T6–T8, the controller also withdraws the even-numbered-mask $12_{even}$ from the station $S_\tau$ and inserts the odd-numbered mask $12_{odd}$ into the station $S_\tau$. The operational cycles are repeated as shown in FIG. 25.

In Example 6, as appreciated in FIG. 25, the controller executed the irradiating step with respect to the even-numbered-mask $12_{even}$, while executing the mask exchanging step with respect to the odd-numbered-mask $12_{odd}$.

Inversely, the controller executes the mask exchanging step with respect to the even-numbered-mask $12_{even}$, while executing the irradiating step with respect to the odd-numbered-mask $12_{odd}$. Thus, Example 6 is advantageous in sharing one laser oscillator 8 to improve production ability.

What is claimed is:

1. A method of producing a laminated mold for casting having three dimensions and formed of a plurality of piled solid layers, which method comprises the steps of:

(a) depositing on a setting surface a deposited layer of a material capable of becoming hardened and forming a solid layer when irradiated by a laser beam, said material being formed of grains or a powder covered with thermosetting resin and;

(b) irradiating said deposited layer with a laser beam to form a solid layer having a two-dimensional horizontal surface extending in an X-direction and a Y-direction transverse to the X-direction, wherein the irradiating step includes:
(i) covering said deposited layer with a mask having a first portion not to be penetrated by said laser beam and a second portion to be penetrated by said laser beam, and
(ii) scanning said laser beam on said deposited layer covered with said mask in such a manner that said laser beam depicts a continuous wave trace which extends beyond the periphery of said second portion by moving said laser beam in said Y-direction with a Y-rotating mirror for moving said laser beam in said Y-direction while repeating oscillations of said laser beam in said X-direction with an X-rotating mirror for oscillating said laser beam in said X-direction, so that said laser beam is moved to penetrate said second portion of said mask and to form the continuous wave trace on said deposited layer; and (c) repeating steps (a) and (b) alternately to form said laminated mold for casting.

2. The method according to claim 1, wherein said depositing step is conducted using a depositing means which includes a storing container for storing said material, and a cutting roller rotatable disposed on said storing container, said cutting roller having a plurality of grooves for discharging said material from said storing container, and said depositing means is moved apart from said deposited layer while rotating said cutting roller, so that said depositing means does not come into contact with said deposited layer while said material is being deposited.

3. The method for producing a laminated object according to claim 1, wherein a frequency of oscillations of said X-rotating mirror is in a range from 20 to 100 oscillations per second, and a spot diameter of said laser beam is in a range from 5 to 40 mm.

4. The method for producing a laminated object according to claim 1, wherein a spot diameter of said laser beam is in a range from 0.2 to 100 mm.

5. The method for producing a laminate mold for casting according to claim 1, wherein each of said deposited layers is formed into said solid layer by repeated cycles of forming of said continuous wave trace, the repeated cycles per each deposited layer is in the range of from 2 to 7 cycles, and the repeated cycles are determined in accordance with the following formula:

$$P=B/(T \cdot Hx), N=D/P$$

where T is a required irradiation time, in seconds, based on a required irradiation area determined by the horizontal sectional area of the deposited layer to be irradiated; B is a length, in millimeters, of said required irradiation area in said Y-direction; Hx is a frequency, in oscillations per second, for said laser beam to oscillate in said X-direction; P is a scan pitch distance between centers of a spot diameter in the Y-direction, in millimeters; D is a spot diameter, in millimeters, of said laser beam; and N is the number of the repeated cycles in which the laser beam passes through a given location.

6. The method for producing a laminated mold for casting according to claim 1, wherein said deposited layer has an over thickness portion and a normal thickness portion, and said over thickness portion has a thickness which is greater than that of said normal thickness portion, said depositing step further including:
using a thickness correcting means to correct the thickness of said over thickness portion, and during the depositing of said material, maintaining said depositing means so that said thickness correcting means contacts said over thickness portion but does not contact said normal thickness portion so as to correct the thickness of said over thickness portion to the thickness of said normal thickness portion.

7. The method for producing a laminated mold for casting according to claim 2, wherein a rotational speed of said cutting roller is larger than a moving speed of said depositing means.

* * * * *

UNITED STATES PATENT AND TRADEMARK OFFICE
CERTIFICATE OF CORRECTION

PATENT NO.: 6,054,192
DATED: April 25, 2000
INVENTOR(S): Yukio Otsuka et al.

It is certified that an error appears in the above-identified patent and that said Letters Patent is hereby corrected as shown below:

ABSTRACT, FRONT PAGE, line 2, "irriating" should read --irradiating--;

line 4, "lader" should read --laser--;

line 10, "nirror" should read --mirror--.

Signed and Sealed this

Third Day of April, 2001

*Attest:*

NICHOLAS P. GODICI

*Attesting Officer*     Acting Director of the United States Patent and Trademark Office